(12) United States Patent
Tenmyo

(10) Patent No.: US 6,400,905 B1
(45) Date of Patent: Jun. 4, 2002

(54) LIGHTING ANGLE VARIABLE LIGHTING DEVICE

(75) Inventor: Yoshiharu Tenmyo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 09/644,701

(22) Filed: Aug. 24, 2000

(30) Foreign Application Priority Data

Aug. 26, 1999 (JP) .......................................... 11-239830

(51) Int. Cl.$^7$ .............................................. G03B 15/06
(52) U.S. Cl. ............................ 396/175; 362/17; 362/18
(58) Field of Search ..................... 396/175, 62; 362/18, 362/17, 16, 277, 319, 327, 308, 339

(56) References Cited

U.S. PATENT DOCUMENTS

| | | | |
|---|---|---|---|
| 5,539,622 A | 7/1996 | Ishikawa | 362/16 |
| 5,666,564 A * | 9/1997 | Albrecht | 396/175 X |
| 5,813,743 A | 9/1998 | Naka | 362/16 |
| 5,926,658 A | 7/1999 | Tenmyo | 396/177 |
| 6,011,929 A * | 1/2000 | Fuke et al. | 396/175 |
| 6,022,117 A | 2/2000 | Tenmyo et al. | 362/17 |
| 6,078,752 A | 6/2000 | Tenmyo | 396/176 |
| 2001/0028559 A1 * | 10/2001 | Tenmyo | 362/16 |
| 2001/0033745 A1 * | 10/2001 | Nakagawa | 396/62 |

FOREIGN PATENT DOCUMENTS

| | | | |
|---|---|---|---|
| JP | 4-138439 | 5/1992 | G03B/15/05 |
| JP | 8-262538 | 10/1996 | G03B/15/05 |

* cited by examiner

*Primary Examiner*—W. B. Perkey
(74) *Attorney, Agent, or Firm*—Fitzpatrick, Cella, Harper & Scinto

(57) ABSTRACT

A compact lighting device or a strobe device includes a discharge tube; a prism unit having an incident surface receiving a light from said discharge tube and an outgoing surface that ejects an incident light to a side of an object to be photographed; and a first optical unit and a second optical unit disposed on said prism unit on the side of the object to be photographed; wherein a relative interval between said first optical unit and said second optical unit are change to vary a irradiating angle of the light directed toward the object to be photographed.

18 Claims, 23 Drawing Sheets

LIGHTING ANGLE VARIABLE LIGHTING DEVICE

BACKGROUND OF THE INVENTION

1. Field of the Invention

The present invention relates to a lighting device, in particular, a lighting device which is capable of varying a lighting angle and a photographing device using the lighting device.

2. Related Background Art

Regarding a lighting device used for a photographing device such as a camera, in order to converge a light beam outgoing from a light source in various directions to the interior of an angle of irradiated necessary view with a high luminous efficacy, there have been proposed various lighting devices up to now. In particular, in recent years, there has been proposed that an optical member using total reflection such as a prism or a light guide is disposed instead of a Fresnel lens disposed in front of the present light source to thereby improve a convergent efficiency and downsize the device.

On the other hand, in a lighting device of the irradiated area fixing type, a light is irradiated onto an unnecessary area in a telescopic state narrow in an irradiated area with a higher zooming magnification of the photographing device, and as the result, an energy loss is increased. In order to solve this phenomenon, there have been conventionally proposed various irradiating angle variable lighting devices that conduct lighting so as to be adaptive to the photographed area.

As a known technique of the lighting system to which the above two kinds of techniques are applied, there has been proposed in Japanese Patent Application Laid-Open No. 4-138439 by the present applicant, that the positional relation between the optical prism and the light source is relatively changed to change over between reflection and transmission to change the irradiated area with respect to a convergent optical system that conducts total reflection by an optical prism. Also, as disclosed in Japanese Patent Application Laid-Open No. 8-262538, there has been proposed a technique in which an optical prism is divided into a plurality of prisms, and the optical prisms disposed at upper and lower positions are rotated to change over the irradiated area.

In recent years, in the photographing device such as a camera, while the device per se is being progressively small-sized and lightened in weight, a photographing lens is intended to make the zooming magnification higher. In general, to make the photographing device small in size and high in magnification has a tendency to make the photographing lens gradually dark, and if photographing is made without using an auxiliary light source, there is a possibility that photographing unexpectedly fails due to vibrations by user's hand.

In order to overcome the above circumstance, a lighting device (hereinafter referred to as "strobe device") is normally integrated into the photographing device such as a camera as an auxiliary light source. However, the frequency of using the auxiliary lighting device is remarkably increased as compared with the conventional one in the above circumstances, and the amount of emission required every photographing is also intended to increase.

Under the above background, in the above conventional example disclosed in Japanese Patent Application Laid-Open No. 4-138439, an outgoing light from a flash discharge tube is divided into upper and lower total reflection control optical path and a face refraction control optical path by an optical prism to control those lights to a given convergent state, respectively, and the position of the light source is shifted from this state so that the total reflection optical path changes over between the total reflection and the transmission to conduct control by another optical path, and the refraction optical path changes the irradiated area so that the irradiating angle is widened.

However, in order to accurately vary the irradiating angle in the above proposed system, because a limit of the face configuration of changing over the total reflection and the transmission is large, there arise such serious problems in the optical design that the degree of freedom of designing the optical prism configuration is small, a light amount loss when the transmitted component of light incomes and outgoes becomes large, and a size of the effective light emitting portion of the light source largely contributes to light distribution.

On the other hand, as disclosed in Japanese Patent Application Laid-Open No. 8-262538 (U.S. Pat. No. 5,813,743), there has been proposed that an optical prism is divided into a plurality of prisms, and optical prisms disposed on upper and lower portions are rotated to change over the irradiated area.

However, in the rotation of the optical prism, because only the irradiating direction of the totally reflected light component is basically wholly shifted, but light distribution characteristic per se is not changed, uniform light distribution is not always obtained at the respective zooming points. That is, the above proposal takes a system in which when those three upper, lower and center areas are overlapped with each other, the most convergent state is formed, and the optical prism is rotated from that state to gradually shift the upper and lower light distributions toward the outer side, to thereby widen the irradiated area. However, during a process of this change, discontinuous points occur on a portion where the respective upper, lower and center light distributions are overlapped with each other, whereby uniform distributions are not always obtained over the entire irradiated area, and a nonuniform point that produces the unevenness of illumination partially exists. Also, because the above structure requires those three upper, lower and center optical prism members, and two optical prisms must be moved in synchronism with each other, there arises such a problem that the structure of the mechanical parts is complicated, and the costs are raised.

As the other prior art, there are U.S. Pat. Nos. 5,539,622, and 6,022,117 proposed by the present inventors.

SUMMARY OF THE INVENTION

The present invention has been made under the above circumstances, and therefore an object of the present invention is to downsize the entire configuration of a lighting optical system and to vary an irradiating angle. Also, another object of the present invention is to unify the light distribution characteristic on the respective zoom points and to reduce the amount of movement caused by a variation of the irradiating angle. Still another object of the present invention is to reduce the number of structural parts to reduce the costs.

Further, still another object of the present invention is to provide an irradiating angle variable lighting device which is small-sized, thin and light in weight. Also, still another object of the present invention is to provide a lighting device such as a still camera or a video camera which utilizes an energy from a light source with a high efficiency, which obtains the uniform light distribution characteristic on the respective zoom points and which is simple and inexpensive in structure, and a photographing device using such a lighting device.

In order to achieve the above object, according to the present invention, there is provided an irradiation angle variable lighting device, comprising:

light source means (discharge tube); an optical prism disposed in front of the light source means for totally reflecting at least a part of an incident light beam from the light source means to irradiate the light beam onto an object to be photographed; and first (panel) and second optical members (front window) disposed on a side of the object to be photographed of the optical prism;

wherein a relative displacement of the first and second optical members is changed to vary an irradiating angle.

In particular, the optical prism comprises: a light outgoing surface; a total reflecting surface; a first light incident surface that refracts a light from the light source means for directly guiding the light to the light outgoing surface; and a second light incident surface for guiding the incident light to the total reflection surface and guiding the light reflected by the total reflection surface to the light outgoing surface.

Also, the optical prism is structured so that the light beam refracted by the first light incident surface and the light beam reflected by the second light incident surface and the total reflection surface are in parallel with each other on a given section.

Also, the light beam refracted by the first light incident surface and the light beam reflected by the second light incident surface and the total reflection surface are substantially in parallel with an outgoing optical axis of the lighting device.

In particular, assuming that an inclination of the second light incident surface with respect to the outgoing optical axis is $\phi$, the following condition is satisfied.

$$0° \leq \phi_0 < 2°$$

Also, the first optical member includes a plurality of lens portions each having a convergent function on the given section, and the second optical member includes a plurality of lens portions each having a divergent function on the given section.

Pitches between the respective lens portions of the first optical member and the second optical member in a direction along which the respective lens portions are arranged are identical with each other, and the paraxial focal distances of the respective lens portions on the given section thereof are identical with each other, and assuming that the pitches are p and the paraxial focal distances are D, the following conditional expression is satisfied.

$$p/2 \leq D \leq 2p$$

Also, there is an embodiment in which the pitches between the respective lens portions and the paraxial focal distances of the respective lens portions on the given section thereof are different from each other.

Further, the light source comprises a discharge tube, and when a longitudinal direction of the discharge tube is an axial direction of the discharge tuber, the first and second optical members include a plurality of lens portions arranged in parallel with the axial direction.

In particular, each of the lens portions are made up of a cylindrical portion.

In this example, assuming that the pitches of the respective cylindrical lenses of the first optical member and the second optical member in a direction along which the respective cylindrical lenses are arranged are identical with each other, and the paraxial focal distances on sections of the first and second optical members taken along faces perpendicular to the axial direction are identical with each other, and assuming that the pitches are p and the paraxial focal distances are D, the following conditional expression is satisfied.

$$p/2 \leq D \leq 2p$$

Also, the respective lens portions on the sections perpendicular to the axial direction in the first optical member include a convergent function, and the respective lens portions on the sections perpendicular to the axial direction in the second optical member include a divergent function.

Further, the photographing device according to the present invention may includes the above irradiating angle variable lighting means. Note that the relative displacement referred to at the beginning, indicates, relative interval, that is, varying of the interval in the direction of outgoing optical axis, and shifting in the direction of outgoing optical axis in a vertical direction.

Other features of the present invention will become clear from the following description.

BRIEF DESCRIPTION OF THE DRAWING

These and other objects, features and advantages of this invention will become more fully apparent from the following detailed description taken with the accompanying drawings in which.

DESCRIPTION OF THE PREFERRED EMBODIMENTS

Now, a description will be given in more detail of preferred embodiments of the present invention with reference to the accompanying drawings.

Figure 1:
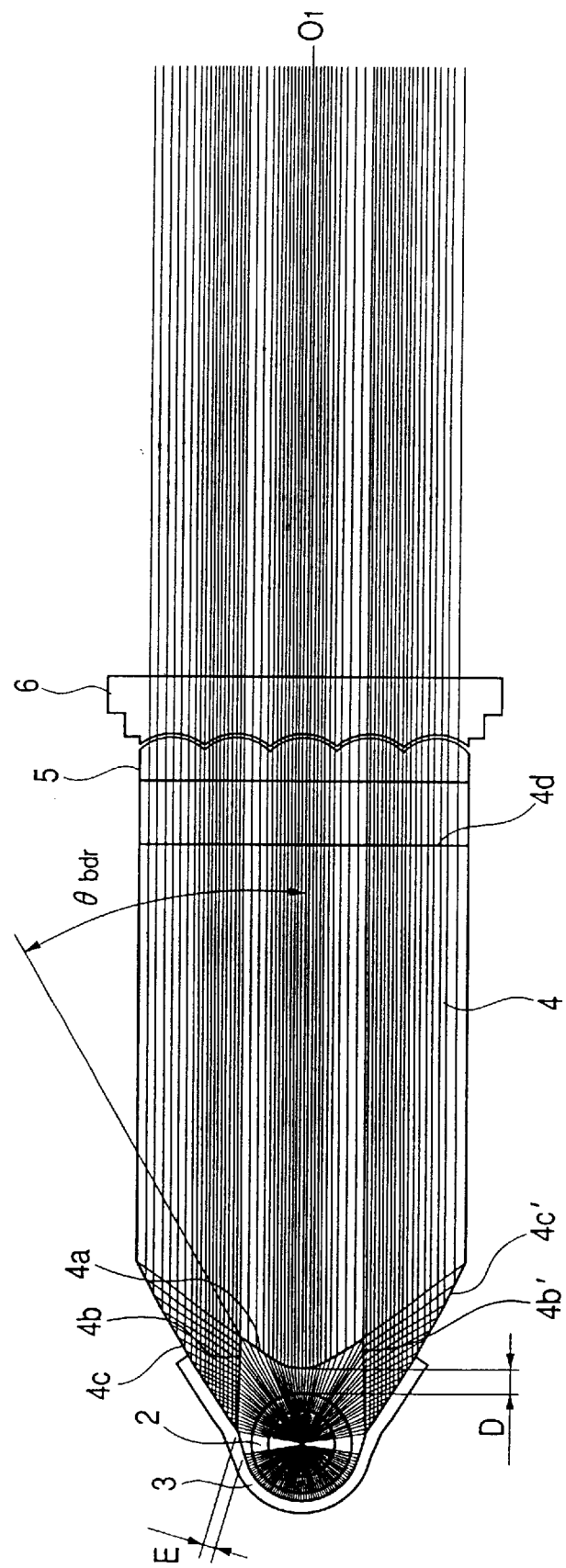
FIG. 1 is a longitudinal cross-sectional view showing a light beam distribution in a converging state in a discharge tube radial direction of a flash emitting device in accordance with a first embodiment of the present invention.
Figure 2:
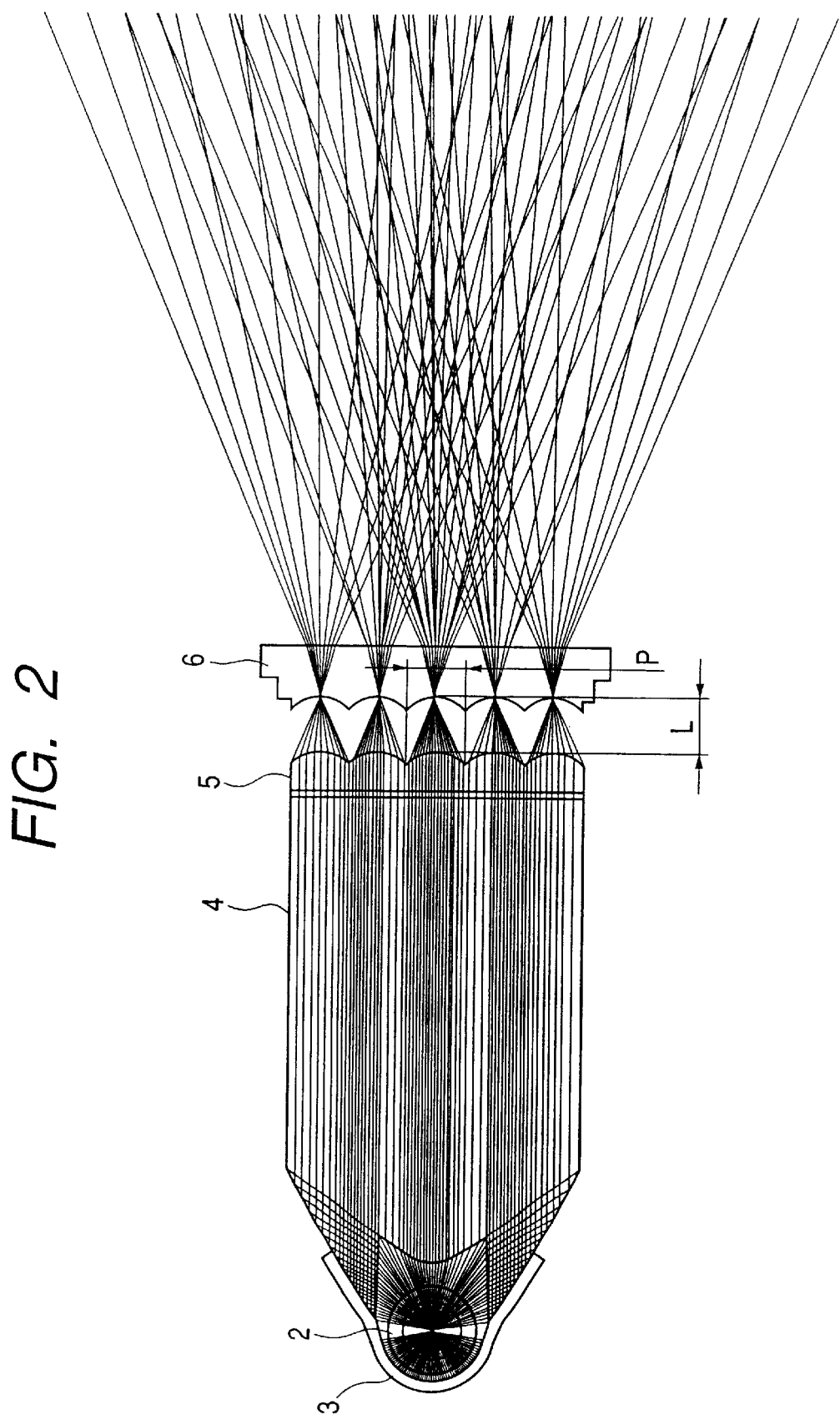
FIG. 2 is a longitudinal cross-sectional view showing a light beam distribution in a diverging state in the discharge tube radial direction of the flash emitting device in accordance with the first embodiment of the present invention.
Figure 3:
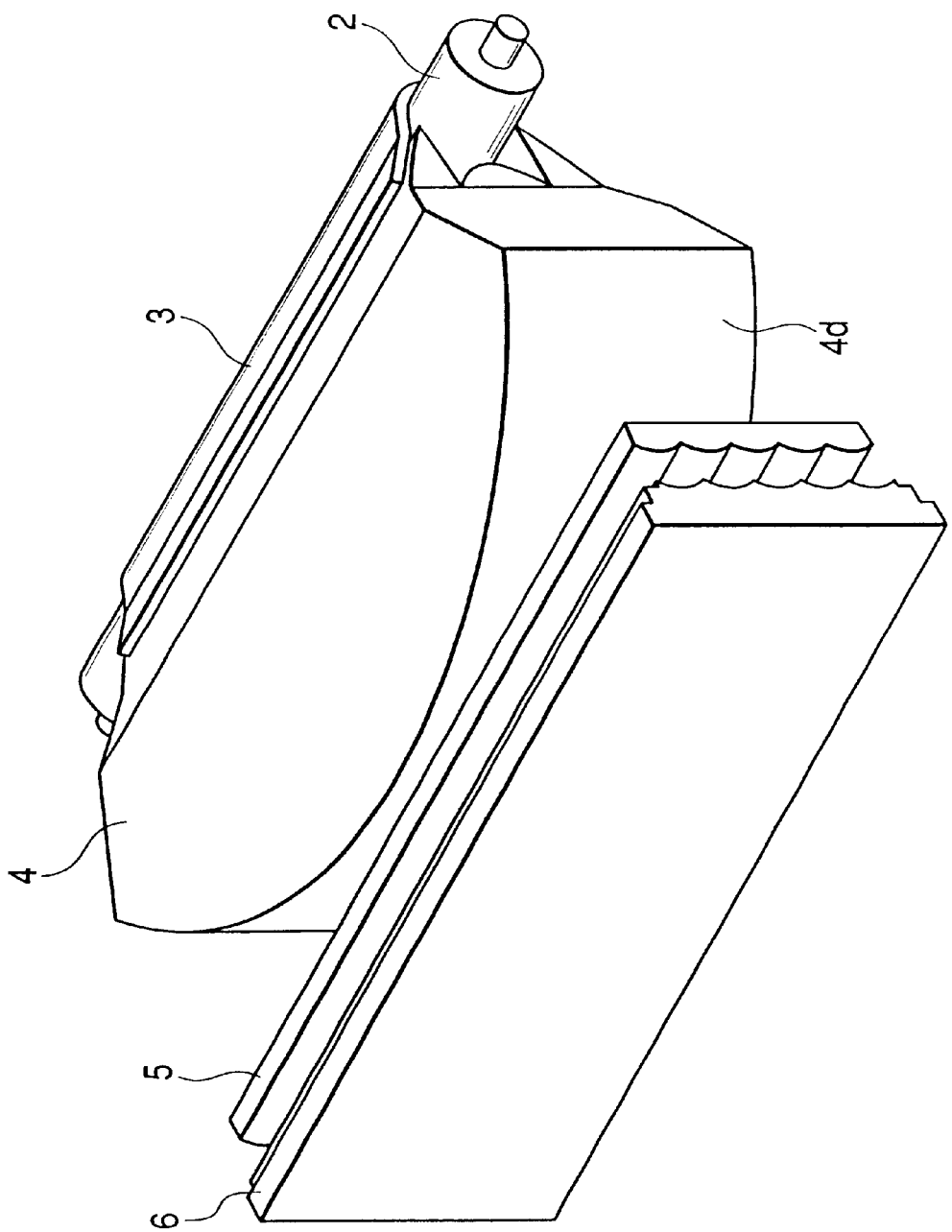
FIG. 3 is a perspective view showing the flash emitting device in accordance with the first embodiment of the present invention.
Figure 4:
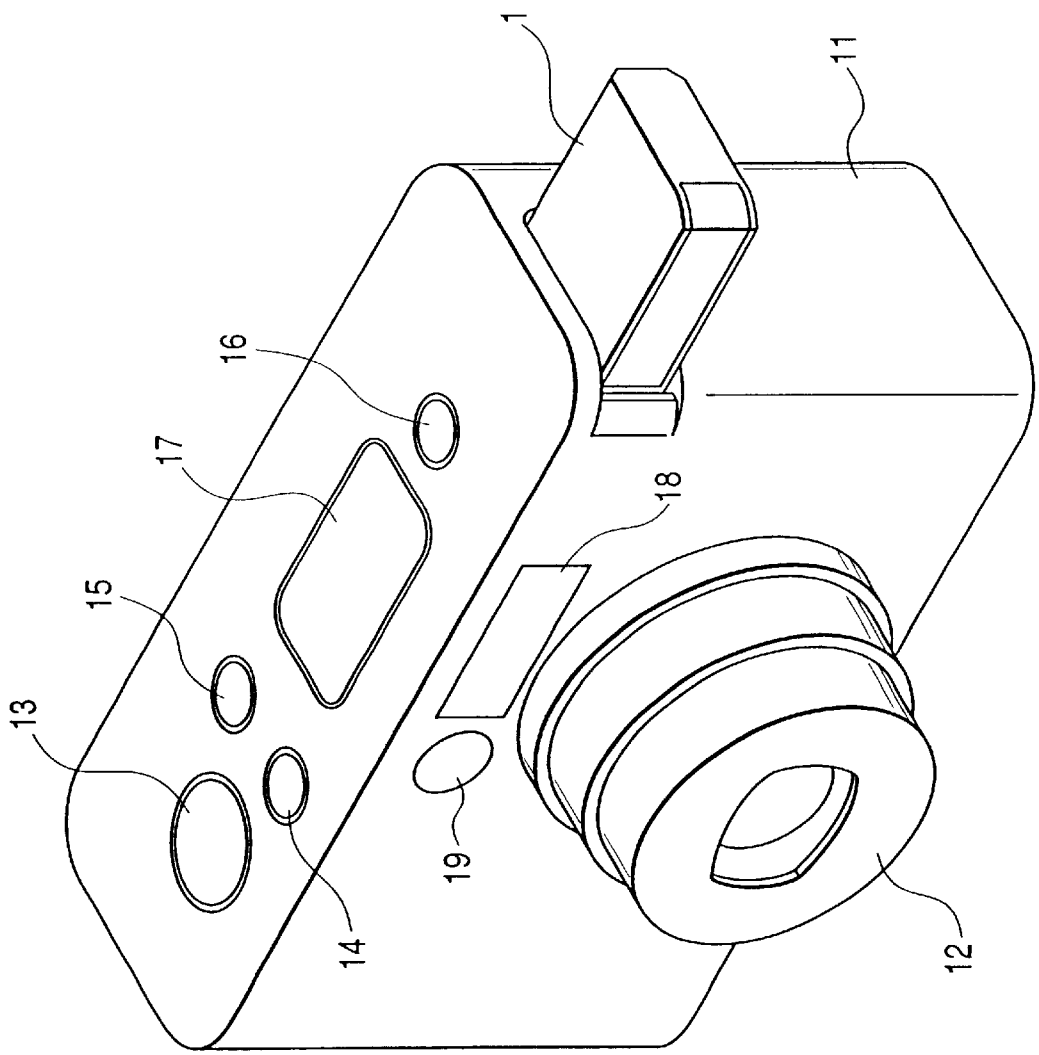
FIG. 4 is a perspective view showing an entire camera to which the flash emitting device in accordance with the first embodiment of the present invention is applied.
Figure 5:
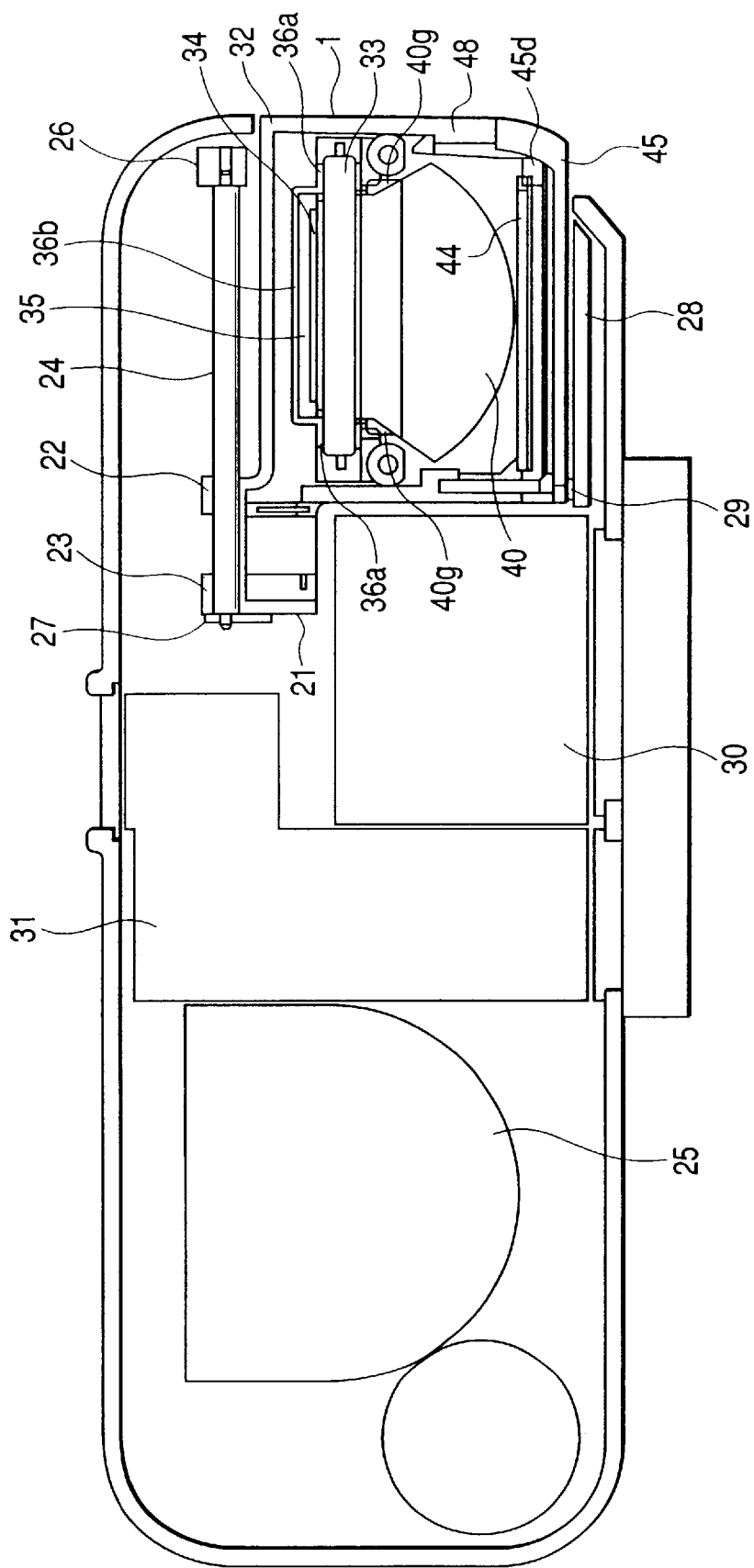
FIG. 5 is a plan view showing the entire camera to which the flash emitting device in accordance with the first embodiment of the present invention is applied.
Figure 6:
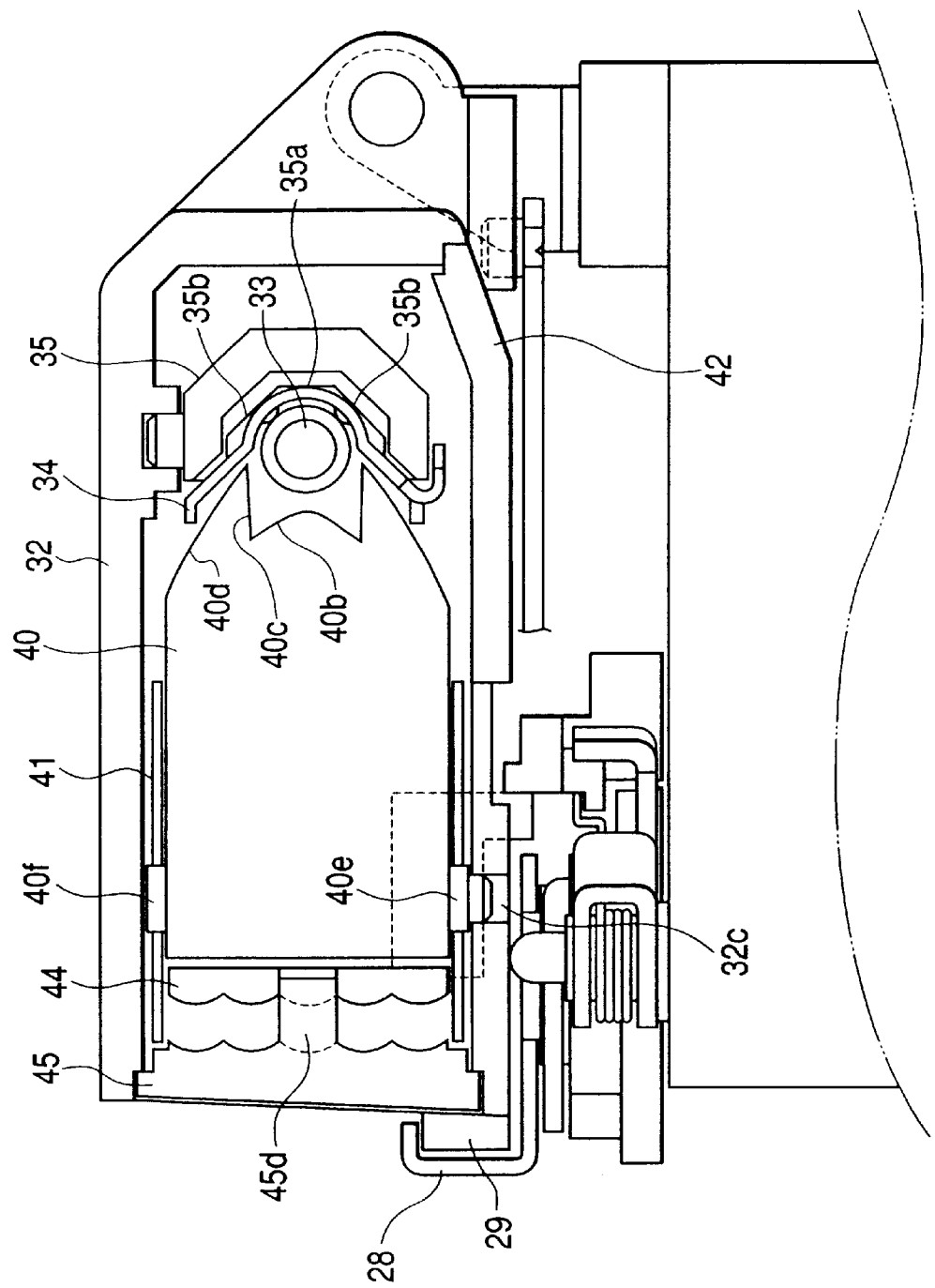
FIG. 6 is a longitudinal cross-sectional view showing the flash emitting device in accordance with the first embodiment of the present invention.
Figure 7:
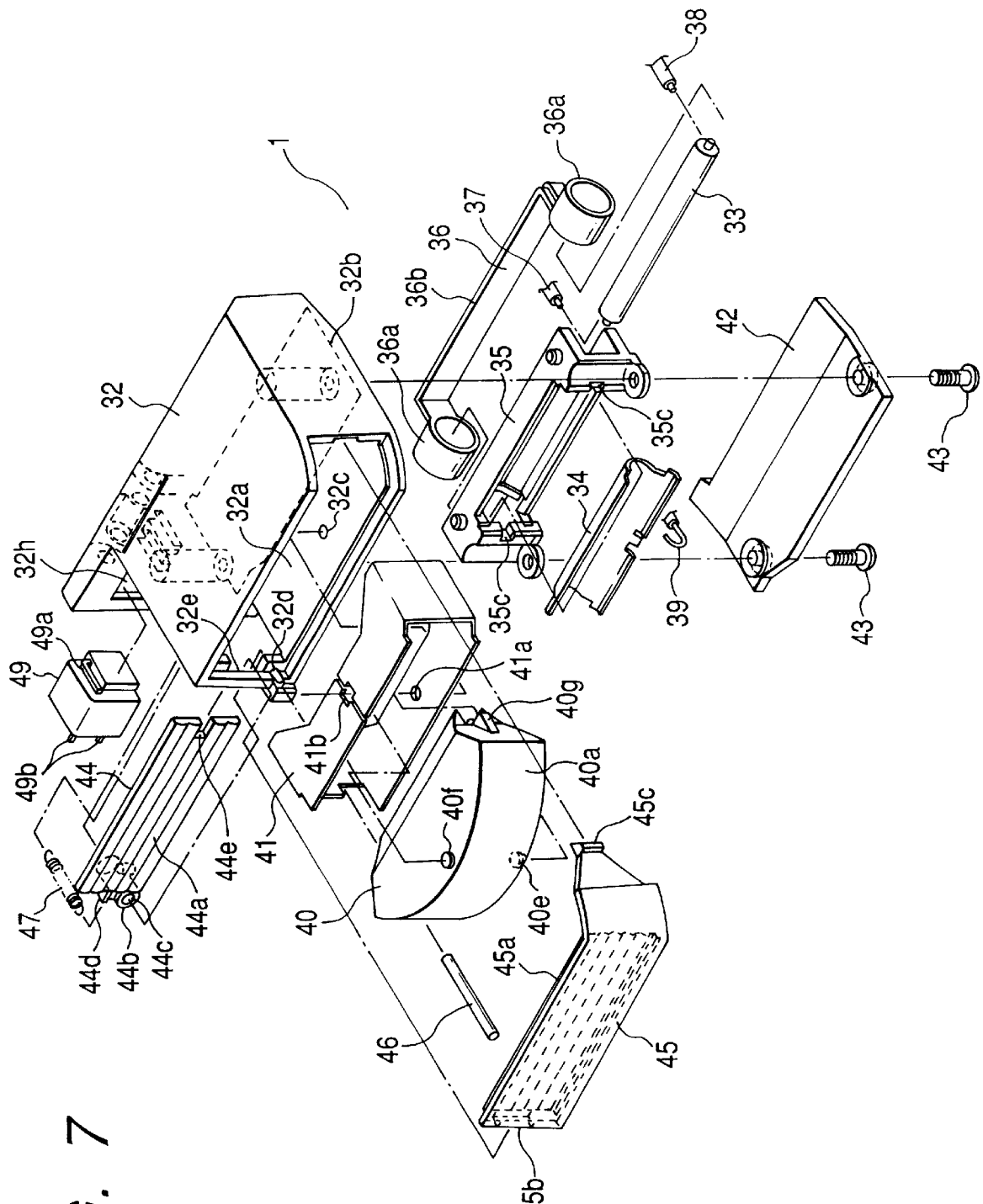
FIG. 7 is an exploded perspective view showing the flash emitting device in accordance with the first embodiment of the present invention.

FIGS. 1 to 7 show a lighting device in accordance with a first embodiment of the present invention, in particular, a flash emitting device in accordance with the first embodiment. FIGS. 1 and 2 are cross-sectional views showing the main portion that constitutes an optical system of the flash emitting device, respectively; FIG. 3 is a perspective view showing the main optical system of the flash emitting device; FIG. 4 is a perspective view showing a camera to which the lighting device of the present invention is applied; FIG. 5 is a view showing a flash emitting portion receiving state viewed from a top of the camera; FIG. 6 is a longitudinal cross-sectional view showing the flash emitting portion, and FIG. 7 is an exploded perspective view showing the flash emitting portion. FIGS. 1 and 2 also shows a light beam trace diagram of the light beam outgoing from the center of the light source together.

In particular, as shown in FIG. 4, the flash emitting device according to this embodiment is disposed on a top portion of a camera main body and structured so as to be projected toward a side of the camera when the camera is in use.

Referring to FIG. 4, reference numeral 1 denotes a flash (strobe) emitting portion; 11, a photographing device main body; 12, a lens barrel with a photographing lens; 13, a release bottom; 14, a telescopic-direction zooming bottom; 15, a wide-direction zooming bottom; 16, an operating bottom for changing over various modes of a camera; 17, a liquid crystal display window for notifying a user of the operation of the camera; 18, an inspection window of a photometric device that measures the brightness of an external light; and 19, an inspection window of a finder. Since the functions of the respective members except for the flash emitting portion are well known, their detailed description will be omitted. The mechanically structural elements of the present invention are not limited to the above-described structures.

Subsequently, the strobe emitting portion 1 will be described with reference to FIGS. 5 to 7.

As shown in FIG. 5, the strobe emitting portion 1 has a projecting portion 21 from the light emitting portion main body on a part of the strobe emitting portion 1 on the back side thereof, and two guide holes 22 and 23 are defined in the projecting portion 21. A guide bar 24 is inserted into the guide holes 22 and 23, and both ends of the guide bar 24 are supported by a holder 26 disposed on the main body 25 and a holder 27 fixed onto the strobe emitting portion 1. Reference numeral 28 denotes a guide plate which guides a convex 29, which is disposed in front of the strobe emitting portion 1, in a vertical direction, to thereby regulate the rotating direction of the strobe emitting portion 1 around the guide bar 24.

In the above state, the strobe emitting portion 1 is movable counterclockwise or clockwise between a receiving position and a projecting position along the guide bar 24 fixed onto the camera main body. Reference numeral 30 denotes a range unit, and 31, a finder unit.

As shown in the figure, at a position where the strobe emitting portion 1 is received, the projecting portion 21 is appropriately positioned in a space which is at a side of the finder unit 31 in the rear of the range unit 30 so that a sufficient width can be ensured in the moving direction, and the backlash of the strobe emitting portion 1 is suppressed to the minimum when the strobe emitting portion 1 is projected, and also a mechanical strength can be sufficiently ensured against the external force.

Also, because the projecting portion 21 is projected inside of the camera from the light emitting portion main body, a stroke from a receiving position to a projecting position can be made as large as the width of the strobe emitting portion main body, thereby being capable of enhancing the read-eye phenomenon relaxation effect.

Subsequently, the structure of the strobe emitting portion 1 will be described with reference to FIGS. 6 and 7.

FIG. 6 is a longitudinal cross-sectional view showing the peripheral portion of the flash emitting portion 1, and FIG. 7 is an exploded perspective view showing the flash emitting portion.

In the figures, reference numeral 32 denotes a case; 33, a flash discharge tube; and 34, a reflector. Reference numeral 35 denotes a holder for holding the flash discharge tube 33 and the reflector 34 within the case 32. The reflector 34 is assembled in the holder 35 from the front side, and the flash discharge tube 33 is thereafter inserted into the holder 35 from the lateral side. In that state, right and left terminal portions of the flash discharge tube 33 are covered with both ends 36a of a rubber 36 from the external of the holder 35.

In that state, the flash discharge tube 33 and the reflector 34 are brought in contact with each other and pushed against the holder 35 due to a tension of a connecting portion 36b of the rubber 36. An abutment surface of the holder 35 against the reflector 34 is made up of three surfaces consisting of a plane 35a and two slopes 35b continuous to upper and lower portions of the plane 35a, and the flash discharge tube 33 and the reflector 34 are stably abutted against those three surfaces due to the tension of the rubber 36 so as to be stably positioned in forward and backward directions and in upper and lower directions.

The right and left terminal portions of the discharge tube 33 are connected to lead wires 37 and 38 by soldering, and a terminal portion of the reflector 34 is fitted onto a trigger lead wire 39. The holder 35 is assembled in the case 32 from a lower side opening 32b of the case 32 in a state where those parts and lead wires are fitted onto each other.

Reference numeral 40 denotes an optical prism for converging or diverging the flash of the flash discharge tube 33 in a direction of the object to be photographed due to the internal total reflection and refraction. An outgoing surface 40a disposed on a front side of the optical prism 40 is made up of a cylindrical lens having a refractive action with respect to the axial direction of the flash discharge tube 33, and a rear side of the optical prism 40 is made up of incident surfaces 40b and 40c for taking in the light beam emitted from the flash discharge tube 33 and a reflecting surface 40d that totally reflects the incident light beam forward. Assuming that the longitudinal direction of the flash discharge tuber 33 is an axis, the optical prism 40 is vertically symmetrical with respect to the axis.

Reference numeral 41 denotes a reflector for conducting control so as to partially reflect the light outgoing from the outgoing surface 40a of the optical prism 40 and to emit the light from the opening portion of the case 32. The optical prism 40 and the reflector 41 are inserted into the case 32 from the front-surface opening portion 32a in a state where the respective axes 40e and 40f are engaged with a hole 41a and a notch 41b, and positioned by engaging a leading portion of the axis 40e with a hole 32c defined in the case 40 on the lower surface side thereof.

In addition, each of right and left sides of the optical prism 40 is provided with a projecting portion 40g, and the projecting portions 40g are inserted into the notch 35c of the reflector holder 35 integrated in advance when the optical prism 40 is integrated into the case 32 from the front-surface opening portion 32a. With the above structure, a displacement of a direction along which the optical axis of the optical prism 40 and the optical axis of the flash discharge tube 33 and the reflector 34 integrated into the reflector holder 35 cross each other can be held at the minimum. Reference numeral 42 denotes a cover portion designed to close the lower opening portion of the case 32, which is screwed to the case 32 by a screw 43 together with the reflector holder 35.

Reference numeral 44 and 45 denote a zoom panel and a front window for changing an interval between the zoom panel 44 and the front window 45 to change the irradiating angle of the flash emitting device. The zoom panel 44 has a plurality of convex cylindrical lenses 44a in parallel with the axis of the discharge tube 33 on its front surface, and is partially provided with a sleeve 44b for moving in forward and backward directions.

The zoom panel 45 is inserted toward a front surface of the optical prism 40 from the lateral direction to the case 32, and the guide bar 46 inserted from the hole 32d of the case 32 and penetrates a hole 44c of the sleeve 44b. The zoom panel 44 is supported by the case 32 so as to be movable along the guide bar 46 in forward and backward directions. In addition, the spring 47 is hung from a spring hanger 44e and a case-side spring hanger so as to be always urged toward the optical prism 40 side.

A rear surface of the front window 45 is of the shape resulting from reversing the cylindrical lenses 44a of the zoom panel 44 and structured by concave cylindrical lenses 45a of the same number as that of the cylindrical lenses 44a, and a front surface of the front window 45 is structured by a plane. The front window 45 has claws 45b and 45c on both of right and left sides and is so structured as to be inserted into the notch 32e of the case 32, and then the craw 45c is inserted while being elastically deformed and then engaged with a scratch portion 48 provided on the case 32. The assembly of the front window 45 allows a hole 32d of the case 32 to be closed and to serve as a stopper of the guide bar 46.

Reference 45d denotes ribs disposed partially on the concave cylindrical lens 45a which are engaged with guide grooves 44e obtained by partially notching the convex cylindrical lens 44a of the zoom panel 44 in an integrated state and stops the rotating backlash of the zoom panel 44 around the guide bar 46. The zoom panel 44 becomes in a wide state where the strobe irradiating angle is wide in a state in which it is positioned backward where an interval between the zoom panel 44 and the front window 45 is wide, but comes in a telescopic state where the strobe irradiating angle is narrow in a state in which it is positioned forward where the interval is narrow.

In this embodiment, in a state where the window 45 is fitted, the panel 44 is moved forward and backward in association with the depressing operation of the zooming bottoms 14 and 15 shown in FIG. 4.

Reference numeral 49 denotes a trigger coil for applying a light emission trigger voltage. A terminal 49a is connected with a lead wire 39 connected to the reflector 33, and a terminal 49b is connected with a lead wire connected to a light emission control circuit substrate not shown. The trigger coil 49 is received in an opening portion 32h defined in the front of the projecting portion 21 integrated with the flash emitting portion case 32, and moves integrally with the flash emitting portion 1 while the flash emitting portion 1 moves.

As described above, with an arrangement of the trigger coil 49, the lead wire 39 that connects the trigger coil 49 and the reflector 33 is extremely short in the overall length so that a voltage drop can be reduced at the time of applying a trigger voltage, and such a problem as light emission failure can be suppressed. Also, the receiving portion of the trigger coil 49 is equipped with a projecting portion for guiding the flash emitting portion 1 when the flash emitting portion 1 is projected or received. Therefore, there arise such advantages that the flash emitting portion 1 can wholly reduce its size and is thickened for formation of the receiving portion in the projecting portion 21, and a strength necessary for the external force received from the external can be sufficiently obtained when the flash emitting portion 1 is projected.

Then, the structural elements that regulate the optical characteristics of the flash emitting portion which is the main portion of the present invention will be described in more detail with reference to FIG. 3.

In the figure, reference numeral 2 denotes a cylindrical flash discharge tube (xenon tube) which corresponds to the discharge tube 33 as described above. Reference numeral 3 denotes a reflector that reflects a component outgoing backward of the light outgoing direction out of the light beam outgoing from the flash discharge tube 2 in an outgoing direction. The reflector 3 has an inner surface made of a metal material high in reflection factor such as aluminum for brightening or having a metallized surface high in reflection factor on the inner surface. This reflector 3 corresponds to the reflector 34.

Reference numeral 4 denotes an optical prism for converging the outgoing light beam from the flash discharge tube 2 to control the light beam to a given light distribution characteristic, which corresponds to the optical member 44 described above. Also, a zoom panel 5 (44) and a front window 6 (45) are transparent members resulting disposed in front of the optical axis of the optical prism and having a plurality of cylindrical lenses formed on opposed surfaces, and a distance between the zoom panel 5 and the front window 6 is changed so as to continuously change the degree of diffusion. The material of the optical prism 4, the zoom panel 5 and the front window 6 are made of an optical resin material high in transmission factor such as acrylic resin.

In the above structure, as in the conventional known technique, for example, in the case where a camera is set to "strobe auto mode", in the photographing device 11, a central processing unit not shown judges whether the flash emitting device emits a light, or not, according to the brightness of the external light measured by a photometric device not shown and the sensitivity of a loaded film after the user depresses the release bottom 13. If the central processing unit judges that "the flash emitting device emits a light" under the photographing circumstances, the central processing units outputs a light emission signal so that the flash discharge tube emits a light through a trigger lead wire 39 mounted onto the reflector.

The emitted light beam passes the optical prism 4 (40), the zoom panel 5 (44) and the front window 6 (45) which are disposed in front of the light beam in such a manner that the light beam outgoing in an opposite direction of the irradiating optical axis passes those members through the reflector 3 (34) but the light beam outgoing in the irradiating direction passes those members directly, and the light beam is converted into a given light distribution characteristic and then irradiated onto an object to be photographed. A change in the light distribution characteristic is conducted by only a slight movement of the zoom panel 5 (44) in this embodiment. This is because, in particular, both of the zoom panel and the front window have a plurality of cylindrical lens portions in parallel with a longitudinal direction of the discharge tube as an axis, and have optical powers inverse to each other, that is, the zoom panel 5 has an optical power of a convergent action and the front window 6 has an optical power of a divergent action, thereby being capable of reducing the amount of movement.

The present invention is structured in such a manner that, in particular, in the case where the photographing lens of the photographing device is a zoom lens, a positional relation between the zoom panel and the front window is changed in accordance with a change in the focal distance so that the vertical light distribution characteristic is mainly adaptive to the photographing lens. Hereinafter, the optical action and configuration will be described in more detail with reference to FIGS. 1 and 2.

FIGS. 1 and 2 are vertical cross-sectional views taken along a radial direction of the flash discharge tube, that is, a cutting plane perpendicular to an axis assuming that the longitudinal direction of the discharge tube is the axis. When the longitudinal direction of the discharge tube is the axis, the axis is perpendicular to the paper face. Also, FIGS. 1 and 2 are diagrams showing a basic view of the irradiating angle variation of the flash emitting device. In those figures, the reference numerals of the respective, members correspond to those in FIG. 3.

The reflector 3 has a semi-cylindrical sectional configuration which is substantially the same as that of the flash discharge tube 2. This configuration is effective in returning the reflected light from the reflector to a portion in the vicinity of the center portion of the light source, makes it difficult to be adversely affected by a refraction of the glass of the flash discharge tube and handles the direct light from the light source and the reflected light from the reflector as the outgoing lights from substantially the same point. As a result, the entire configuration of the downstream optical system can be downsized.

On the other hand, a cylindrical surface 4d is formed on a front surface (outgoing surface) of the optical prism 4 as shown in FIG. 3. The cylindrical configuration directs its convex surface toward the object to be photographed and has a convergent action with respect to the longitudinal direction of the discharge tube. This is effective in effectively conducting convergence in the axial direction (longitudinal direction) of the flash discharge tube 2, that is, in the right and left directions on the irradiated surface. That is, because the light is refracted under the control at the cylindrical surface which is relatively apart from the light source, unnecessary light irradiation to the exterior of a necessary angle of view can be reduced, and there is no loss of the amount of light on a Fresnel edge portion which is caused when a Fresnel lens frequently used in the flash emitting device is employed, as a result of which the uniform and effective convergence can be conducted.

Also, the respective opposed surfaces of the zoom panel 5 and the front window 6 have a plurality of cylindrical lens surfaces which substantially lies one upon another and are disposed in parallel with the longitudinal direction of the discharge tube. FIG. 1 shows a state (a telephotographing state) in which those two members are closest to each other, and FIG. 2 shows a state (a wide photographing state) in which those two members are apart from each other by a given distance.

FIGS. 1 and 2 also show a trace of the representative light beam outgoing from the center portion of the inner diameter of the flash discharge tube 3 together. In FIGS. 1 and 2, the positional relation between the zoom panel 5 and the front window 6 and the structures and the configurations of all the optical systems except for the light beam are identical with each other. In a first embodiment as will be described below, an irradiated area can be continuously changed while the vertical light distribution characteristic is held constantly on a photographing screen, and the height of opening in the vertical direction is suppressed to the required minimum. Hereinafter, the characteristic of the configuration and the behavior of the light beam at that time will be described in more detail.

First, in FIG. 1, there is shown the inner and outer diameters of the glass tube as the flash discharge tube 2. As the light emitting phenomenon of the actual flash discharge tube in the flash emitting device of this type, there are many cases in which a light is emitted over the entire inner diameter in order to improve the efficiency, and it can be considered without any problems that the light is substantially uniformly emitted over the entire inner diameter of the flash discharge tube. However, at a design stage, in order to control the light outgoing from the light source with a high efficiency, the light beam over the entire inner diameter is considered at the same time, whereby the configuration of the optical system is designed assuming that a point light source ideally exists in the center of the light source, and thereafter correction is made taking a fact that the light source has a limited size into consideration, thereby being capable of designing the optical system with a high efficiency.

In the present specification, the center of the light emitting portion of the light source is regarded as a reference point of the configuration determination on the basis of the above viewpoint, and the configurations of the respective members of the optical prism are set in the following method.

First, the optical prism 4, the zoom panel 5 and the front window 6 are properly made of an optical resin material such as acrylic resin from the viewpoints of a molding property, the costs and the optical characteristic. However, setting must be made taking into consideration not only the above characteristics but also a fact that a large amount of heat is generated at the same time where a light is produced from the light source in the lighting device of this type. That is, it is necessary to select the optical material and to set a heat discharge space, taking the thermal energy generated for each light emission and the shortest light emitting period as the thermal influence into consideration.

In this situation, the respective incident surfaces of the optical prism 4 positioned closest to the light source are actually liable to be most affected by the heat, and it is necessary that the shortest distance between the light source and the incident surfaces is first determined. In the first embodiment, assuming that the shortest distance between the light source and a first incident surface 4a that controls an angular component of the outgoing angle from the center of the light source close to the outgoing optical axis directly by refraction is D, and the shortest distance between the light source and a second incident surface 4b that makes incident a light which totally reflects the angular component apart from the outgoing optical axis under the control is E, the interval is regulated.

In this embodiment, specific numeric values are as follows:

The outer diameter of the flash discharge tube is $\phi 2.3$, the inner diameter thereof is $\phi 1.3$, D is 0.6, and E is 0.38.
In the above numeric values, the unit is [mm].
Then, the configurations of the second incident surfaces 4b and 4b' that guide the incident light to the total reflection surface (4d) of the optical prism are determined. In order to minimize the configuration of the optical prism, it is desirable that the configurations of the second incident surfaces 4b and 4b' are planes which are in parallel with the outgoing optical axis. In the present specification, the outgoing optical axis is defined as a light beam that is emitted from the center of discharge tube and goes toward the center of lighting without being refracted or reflected. In FIG. 1, the outgoing optical axis is represented by O1.

In other words, a component of the light beam outgoing from the light source which progresses in a direction different from the outgoing optical axis is refracted on the incident surface once. This is because the effect of refraction becomes larger as the angle of that incident surface is smaller, and the incident light can be guided in a direction apart from the optical axis by refraction once, and the overall length of the optical prism can be suppressed to be shorter.

The inclination between the second incident surfaces 4b and 4b' is determined by the molding conditions of the optical prism. As the angle is smaller, the actual molding conditions become severe. However, assuming that the maximum value of the angle of that incident surface is $\phi o$, it is desirable that the maximum angle exists within the following range regardless of the incident surface being a plane or a curve.

$$0 \leq \phi o < 2° \tag{1}$$

Apparently, the above range is difficult set values. However, since a distance to the second incident surface is short, and the surface configuration is smooth, the above values are sufficiently possible to achieve. In this way, the inclination between the second incident surfaces 4b and 4b' are regulated, thereby being capable of realizing the above set value with minimizing the vertically opening area and without deteriorating the efficiency.

Subsequently, a method of determining the incident surface configuration of the first incident surface 4a will be described.

In this embodiment, because the light distribution characteristic is greatly changed with a small configuration, the configuration of the first incident surface 4a is determined by the following method. An optical power configuration which directs a convex surface toward the light source side is given in such a manner that a component of the outgoing light beam from the center of the light source which is entered directly to the incident surface 4a is so converted as to be in parallel with the outgoing optical axis when being viewed from the section shown in the figure. In particular, a focal distance having a length to the center of the light source taking the thickness of glass of the flash discharge tube into consideration is given to the focal distance of the incident surface 4a to constitute a cylindrical surface a spherical aberration of which is corrected.

Also, the surface configurations of the second incident surfaces 4b and 4b' and the configurations of the total reflection surfaces 4c and 4c' are set by the following method because the optical system of the minimum configuration is formed in this embodiment.

In other words, a light component incident to the incident surfaces 4b and 4b' out of the outgoing light beams from the center of the light source is reflected by the total reflection surface, and the light component is converted so as to be in parallel with the outgoing optical axis when being viewed from the sections in the figures.

Then, a light beam of the outgoing light from the flash discharge tube 2 which goes backward of the outgoing optical axis is again made incident to the flash discharge tube after being reflected by the reflector 3, passes through substantially the center of the flash discharge tube and is then guided forward of the outgoing optical axis, because the configuration of the reflector 3 is concentric with respect to the flash discharge tube as shown in FIG. 1. The appearance of the light beam subsequent to the return of the light beam to the center of the light source are identical with that in the above description.

As described above, the light beam outgoing from the center of the light source is converted into a component which is in parallel with the outgoing optical axis with respect to all the sections of the figures, and then guided to the outgoing surface 4d, after the light beam is refracted by the incident surface 4a of the optical prism, or after the light beam is refracted by the incident surfaces 4b and 4b' and then reflected by the total reflection surfaces 4c and 4c'. Also, the depth of the optical prism is extended to such a length that a component of the light beams incident from the second incident surfaces 4b and 4b' which is directly closest to the incident surface 4a can be totally reflected.

For that reason, the component incident from the second incident surfaces 4c and 4c' is not directly emitted toward the light outgoing surface 4d with the results that the efficiency is enhanced and control is enabled at the minimum size. Then, in the case where the inner diameter of the light source is sufficiently small or the optical prism is sufficiently large with respect to the light source, convergence can be remarkably effectively controlled.

However, the size of the inner diameter which is the effective light emitting portion of the light source is not small to the degree which can be ignored from the view point of the actual light distribution characteristic, and the light beam that has passed through the optical prism is not completely converted into a component which is in parallel with the outgoing optical axis by the above influence, but is converted to a distribution vertically expending ever a given area. In particular, the control surface close to the light source, for example, the incident surface 4a that directly controls the outgoing light beam from the light source or the reflected light beam by the total reflection surface 4c on the rear end portion close to the light source largely receives the above influence, and in fact, the light distribution is expanded to some degree by the component controlled in the above area.

Subsequently, the position of a boundary surface of the incident surface will be described. As described above, as the conditions for constituting the optical system which is high in efficiency and smallest in size taking a thermal influence on the resin material of the incident surface into consideration, it is desirable that an angle θbdr of a straight line connecting the coordinates of a cross point of the first incident surface 4a and the second incident surfaces 4b, 4b', and the center of the light source with respect to the outgoing optical axis is within a given range. In other words, if the angle is smaller than the given angle, a distance to the first incident surface 4a is made far, and it is difficult that the resin material of the incident surface is influenced by the size of the light source. In addition, the converging efficiency by refraction is enhanced whereas an incident angle to the second incident surfaces 4b and 4b' becomes large, thereby being liable to produce a loss due to the surface reflection on the incident surface. On the other hand, if the angle is larger than the given angle, the incident light beam from the first incident surface 4a which should be controlled on a surface close to the light source increases, thereby making it difficult to obtain a sufficient converging effect depending on the size of the light source.

Under the above circumstances, it is desirable that the angle of the above straight line is within the following numeric range. That is, it is assumed that an inclination of a line connecting a boundary line between the incident surface 4a that controls the light directed toward the front surface of the optical prism by only refraction and the incident surfaces 4b, 4b' that guide the light outgoing from the light source obliquely forward to the total reflection surface, and the center of the light source with respect to the outgoing optical axis is θbdr. Then, it is desirable that the inclination θbdr satisfies the following expression from the view points of the efficiency and the converging control.

$$25°\leq \theta bdr \leq 45° \tag{2}$$

Subsequently, the configuration of the cross points of the incident surfaces 4b, 4b' of the optical prism 4 and the total reflection surfaces 4c, 4c' will be described. In the first embodiment, the cross points directly cross each other to form an acute angle. This structure is effective in conducting the light distribution control with a high efficiency while the configuration of the optical prism is minimized. That is, for example, if a surface different in characteristic, for example, a surface perpendicular to the optical axis is formed between the incident surface and the total reflection surface as disclosed in Japanese Patent Application Laid-Open No. 8-262537 (U.S. Pat. No. 5,813,743), the surface does not function as the optical system, and the optical prism is caused to be large-sized vertically or depthwise, which is not desirable in configuration from the view point of downsizing.

On the other hand, in this embodiment, there is structured so that the position of the cross point and the position of the center of the light source in the forward and backward direction approach each other as much as possible. This is the necessary configuration for downsizing the entire optical system and preventing the efficiency from being deteriorated, and the configuration is closely related with the total reflection angle within the prism and the configuration of the reflector adaptive to the light source.

In other words, assuming that the angle of the total reflection within the prism with respect to the incident surfaces 4b and 4b' is set to about 0°, and the optical prism is made of a resin material, taking the fact that its refraction factor is about 1.5 into consideration, if the cross point of the prism surface is extended up to the backward side, there occurs a component of the light beam which is emitted backward of the prism without satisfying a critical angle and without completely totally reflecting the light. The component is liable to occur more as the inner diameter of the light source is larger, and a part of the components outgoing forward from the center of the light source goes through the total reflection surfaces 4c and 4c'.

In this embodiment, although a reflection surface that again returns the light which goes through the total reflection surfaces 4c and 4c' backward to the optical prism is formed on an extension of the reflector 3, because the absorption on the reflector 3, a loss of light amount due to the surface reflection of the outgoing and re-incident light, etc., are liable to occur, the above configuration is not always preferable. Accordingly, the structure is made so that the reflector 3 is extended to the maximum size that effectively functions as the reflector, and the light is made incident on the optical prism surface.

In other words, in this embodiment, the configuration of a portion near the center of the reflector is substantially semi-cylindrical surface concentric with the flash discharge tube, and a rear end of the optical prism is also extended so as to approach substantially the center of the light source. The reasons that the configuration of the reflector is so designed as to be concentric with the center of the light source are as follows: first, an influence on the glass portion of the flash discharge tube is recited. In the extremely downsized light emitting optical system as in this embodiment, it is necessary that the light beam directed from the light source backward is reflected by the reflector so as to be directed in the radiating direction. However, because the entire optical system is downsized, it is impossible from the spacial viewpoint to control all the reflected light by the reflector not through the interior of the flash discharge tube but through the external of the flash discharge tube, and it is necessary to take an optical path for making a part of the reflected light beam incident to the interior of the glass tube of the flash discharge tube again.

In this situation, a component of the light beam made incident to the flash discharge tube again is influenced by refraction, the surface reflection and the total reflection on the glass portion of the flash discharge tube, and a component of light beam incident to the optical prism 4 disposed forward are also greatly influenced by such refraction and reflection. In particular, in the case where the glass thickness is thick, the above tendency is remarkable, as a result of which if the configuration of the light source and the configuration of the reflector are appropriately adapted to each other, the distribution of the reflected light from the reflector is unnecessarily widened.

Under the above circumstances, the reflector is formed in a cylindrical surface configuration corresponding to the outer configuration of the light source and made concentric with the cylindrical glass portion of the flash discharge tube. As a result, because the incident angle at the time of making the light beam incident to the flash discharge tube again becomes small, a loss due to the surface reflection on the glass tube surface is small, and also because components of the light beam which is made incident again and totally reflected within the glass tube are reduced, the amount of light irradiated onto the effective region can be increased.

In particular, if a gap between the reflector and the light source is small, a variation in the angle after the light beam being reflected by the reflector is small. As a result, the small gap is significantly effective. Also, the reason that the reflector is formed in substantially semi-cylindrical shape which substantially coincides with the position of the center of the light source is that if the reflector is set to be longer, the reflector goes around the light source forward, and the light is confined within the reflector, which is not preferable because the efficiency is deteriorated. On the other hand, if the reflector is extremely made shorter than the center of the light source, the components of the light beam entering the flash discharge tube after being reflected by the reflector 3 which is out of the center portion of the light source increase. As a result, the light beam is influenced by refraction, the surface reflection and the total reflection on the glass portion of the flash discharge tube to increase the loss of the light amount, and it becomes difficult to control the component of the light beam reflected by the reflector in the same manner as that of direct light. Therefore, the above structure is not desirable.

Also, the reflector 3 goes around the light source up to substantially a front end of the flash discharge tube which is the light source in the rear of the total reflection surfaces 4c and 4c' of the optical prism 4, and the configuration of the reflector 3 is substantially identical with the total reflection surfaces 4c and 4c'. This reason is that the inner-diameter portion of the glass tube which is a light emitting portion of the flash discharge tube exists a front side from the center of the light source, and a part of light beam outgoing from the front side is prevented from going to the external without being totally reflected by the total reflection surfaces 4c and 4c'. As described above, since the reflector 3 is substantially identical in structure with the total reflection surface and disposed in the just rear of the total reflection surfaces 4c and 4c', the reflector 3 has substantially the same effect as that of the total reflection surfaces 4c and 4c', thereby enabling a uniform distribution in a necessary irradiated area with a high efficiency.

Since the configuration of the optical prism is regulated by the above-described method, the condensing optical system which is the smallest and highest in efficiency can be formed taking a given heating condition of the light source into consideration. The irradiating angle variable mechanism according to the present embodiment is characterized in that the convergent light beam is gradually diffused at a given rate with the small-sized converging optical system as a base, to thereby control the light beam so as to be identical with the necessary light distribution characteristic.

For that reason, the size of the converging optical system in the most convergent state which has caused the system to be large-sized conventionally can be small-sized, and the convergent operation can be changed linearly. Thus, the characteristics required as the irradiating angle variable lighting optical system can be efficiently achieved. Also, because the amount of movement due to a variation in the irradiating angle is extremely small as compared with that in the conventional system, the lighting optical system excellent in space efficiency which is suitable to the small-sized photographing device can be designed. As a result, the lighting optical system which does not require remarkably additional structural parts and inexpensive can be structured.

Hereinafter, the most significant irradiating angle varying method according to the present invention will be described with reference to FIGS. 1 and 2. FIG. 1 shows the most convergent state (a telephotographing state), and FIG. 2 shows a state (a wide photographing state) in which the irradiated area is widest. First, a plurality of cylindrical lenses (lens portions) each having a positive refractive force of a focal distance G a spherical aberration of which is corrected, that is, a converging action are formed in parallel with an axial direction at pitches P on the light outgoing surface side of the zoom panel 5 when a longitudinal direction of the flash discharge tube is the axis. Then, a plurality of cylindrical lenses each having a negative refractive force, that is, a divergent action so as to coincide with a plurality of cylindrical surfaces of the zoom panel 5 in a state where they are substantially in close contact with each other (see FIG. 1) are formed at the same pitches P and at the same phase as those of the cylindrical lenses of the zoom panel 5.

As shown in FIG. 1, in the state where the optical prism and the optical panel are substantially in close contact with each other, the power of the cylindrical lenses having the positive refractive force and formed on the light outgoing surface of the zoom panel is offset against the power of the cylindrical lenses having the negative refractive force and formed on the front window, and the light beam is outgoing from the front window 6 with the characteristic converged by the optical prism. This state corresponds to the most convergent irradiating angle variable state.

Subsequently, the diffusion state shown in FIG. 2 will be described. FIG. 2 shows the movement of the zoom panel 5 with respect to the front panel 6 fixed onto the outside portion of the photographing device. This embodiment shows a state in which assuming that the maximum movement amount is L, the zoom panel 5 is moved up to a position which substantially coincides with the focal distance G of the cylindrical lenses of the zoom panel 5.

As shown in the figure, the light beam which has been emitted from the optical panel 1 is uniformly spread at a given rate as compared with FIG. 1, and it can be readily supposed that the light beam is uniformly irradiated onto the necessary lighting irradiated area with a given spread even taking the size of the light source into consideration.

In this example, the amount of movement of the zoom panel 5 must be determined in accordance with not only the limit of a mechanical space, but also a precision in stopping a drive system, a precision in detecting the amount of movement, a hysteresis to the moving direction, the amount of change in the light distribution characteristic to an error in the movement, etc. In the structure of this embodiment, an range of an actually applicable configuration can be limited to some degree. Hereinafter, a desirable setting range will be described.

First, a description will be given of a case in which concave and convex cylindrical surfaces whose configurations substantially coincide with each other are formed on opposed surfaces of the zoom panel and the front window as described in the above first embodiment. In this case, a variation in the irradiating angle is determined by the refractive force of the convex lens formed in the optical prism. Although a larger refractive force makes the irradiating angle variation larger, the light component which cannot be emitted from the zoom panel in the optical axial direction by total reflection is caused to increase.

Subsequently, a setting region of the desired refractive force of the convex lens according to this embodiment will be described with reference to the first embodiment shown in FIGS. 1 and 2. As shown in the figures, assuming that the maximum clearance of the lenses is L, the pitches of the respective cylindrical lenses are P and the paraxial focal distance of the lenses is D, if the respective relations are regulated as follows, the irradiating angle variable lighting optical system small in size, high in the optical performance and excellent in efficiency can be formed.

First, it is desirable that the relative distance L between the zoom panel 5 and the front window 6 for changing the irradiating angle is within the following range.

$$0.5 \leq L \leq 5.0 \quad (3)$$

where the unit of L is mm, and the minimum value 0.5 is a numeric value determined by the mechanical limit with the movement. In other words, as an actual problem, it is difficult to progress the panel surfaces relatively wider in the optically effective range in parallel and hold the interval between the panels uniform as in this embodiment. That is, the mechanical holding method is difficult such that an inclination is partially produced depending on a guiding method, a hysteresis is produced in the movement of reciprocation, or the inclination is produced by a difference in attitude depending on the holding method, and there arises such a problem that the optical characteristic is made largely different by the mechanical error. Also, if the interval between the panels is shorter than a required interval, it is difficult to structure the device inexpensively because a driving system control method and a specific control method and detecting method for a precision of detection of the interval between the panels are required.

For that reason, in this embodiment, the minimum value of the full stroke required for varying the irradiating angle between the zoom panel 5 and the front window 6 is regulated to 0.5 mm as the minimum value that does not cause the above influence, and it is presumed that if the stroke is larger than at least the minimum value, the irradiating angle variable mechanism is inexpensively realized.

On the other hand, the maximum value 5.0 of L is a numeric value regulated by the size of the entire configuration of the lighting optical system. That is, a significant object of the present invention is to downsize the lighting optical system, and there arises such a problem that the entire optical system becomes excessively large if the distance between the zoom panel 5 and the front window 6 is made longer than a required distance.

The amount of movement permissible as the irradiating angle variable mechanism according to the system of this embodiment is sufficiently satisfied by the above-described amount of movement which is sufficiently smaller than the amount of movement of the zoom strobe in the conventional system, and setting of the amount of movement to be larger than the above amount of movement is opposed to the downsizing of the device which is the merit of this system, and the charm of the present invention is largely reduced. Therefore, the maximum amount of movement is regulated to the above value.

Subsequently, a rate of the irradiating angle variation will be described.

In order to regulate the irradiating angle variation, it is desirable that the relation between the paraxial focal distance D and the pitches P of the respective lenses as the refractive force of the cylindrical lenses is regulated by the following expression.

$$P/2 \leq D \leq 2 \times P \quad (4)$$

The above expression is to regulate the rough configuration of the respective cylindrical lenses. The meanings of the above expression will be described in detail with reference to the configuration shown in the first embodiment.

First, the paraxial focal distance D representative of the refractive force of the cylindrical lenses is a portion that controls the convergence and divergence of the lighting optical system, and most of the optical characteristics of the irradiating angle variation is determined by that portion, and the irradiating angle can be more largely varied with the fine amount of movement as the focal distance is shorter, and the irradiating angle can be more gently varied as the focal distance is longer. For that reason, the degree of freedom is provided to some extent depending on the mechanical structure of the applied zoom system, and no univocal optimum value exists. That is, if the mechanical control system can accurately conduct the positional control with having preference to the downsizing even if the costs are somewhat increased, it is desirable to make the focal distance D short, and also if the structure is made so as to permit the size to be somewhat increased with having preference to the optical performance and the costs, it is desirable to set the optical distance to be longer in order to naturally structure the irradiating angle variable optical system high in efficiency.

On the other hand, the actual control of the irradiating angle is closely related with the pitches P corresponding to the size of the opening portions of the respective cylindrical lenses as in the focal distance of the cylindrical lens. That is, after the outgoing light from the center of the light source is made substantially in parallel with the optical axis by the optical prism 4, the degree of diffusion is adjusted by the cylindrical lenses on the outgoing surface of the zoom panel 5. The degree of diffusion is changed in accordance with the area of the openings even if the lenses of the same focal distance are used, so as to be converted into the light distribution large in the degree of diffusion if the openings are large. However, if the opening portions are small, only the light distribution small in the degree of diffusion is obtained.

Also, if the opening is unnecessarily large, as described above, the totally reflected components on the lens surface are increased, thereby being not capable of varying the irradiating angle with a high efficiency. In addition, if the opening is smaller than a required opening, the irradiating angle cannot be expanded up to the range represented by the above expression even if the amount of movement is made as long as possible. From the above fact, to satisfy the conditions of the range represented by the above expression is required to achieve the irradiating angle variable lighting device of this type.

In the above expression, the relation of the pitches P is expressed on the basis of the paraxial focal distance D of the cylindrical lens, and the above expression exhibits a relative expression in which if the paraxial focal distance D is P/2 or less, because the variation in the irradiating angle is extremely large, thereby making the control difficult and the loss due to total reflection is increased, it is not preferable, whereas if the paraxial focal distance D is larger than P×2, because the variation in the irradiating angle is small, and the device is large-sized, it is not preferable.

On the other hand, a cylindrical surface 4d having a refractive force in the axial direction with the discharge tube being longitudinally disposed is formed on the side of the object to be photographed of the optical prism as shown in FIG. 3 to converge the light in the axial direction of the flash discharge tube. In this embodiment, although convergence and divergence are conducted efficiently on the radial section of the flash discharge tube shown in FIGS. 1 and 2 by the relative movement of the optical prism and the optical panel, the light source is so long in the axial direction of the flash discharge tube as to make it difficult to converge the light. On the contrary, the light convergence in the axial direction of the flash discharge tube is shaped so as to converge the light so that the light distribution characteristic corresponding to the widest necessary irradiated area is obtained by forming the cylindrical lens surface 4d of the optical prism 4 provided on the side of the object to be photographed.

As described above, if the light source is sufficiently small with respect to the optical system, the light source effectively functions in the section in the radial direction of the flash discharge tube in this embodiment, but the light source ineffectively functions if the light source per se is large with respect to the optical system. For that reason, the ideal light source is a form close to a point light source, and that the configurations of the above optical prism and the optical panel can be formed in a rotationally symmetric configuration is ideal. However, although the ideal configuration is obtained only in a given section as described above, the excellent light distribution characteristic and the optical characteristic which are excellent as a whole as compared with the conventional system can be obtained by making the entire configuration small and making the efficiency high by using total reflection.

Subsequently, the setting value of the lighting optical system in this embodiment will be described with reference to FIGS. 1 and 2 while applying specific numeric numerals.

First, in the structure of the diffusing portion, the pitches P of the cylindrical lenses of the zoom panel 5 and the entire surface panel 6 (front window) are constant in the first embodiment, that is, P=1.5 mm. The respective configurations are set so that the maximum amount of movement L with respect to the front window 6 of the zoom panel 5 is 1.5 mm, and the focal distances D of the respective cylindrical lenses are constant, that is, D=1.5 mm. The above respective values satisfies a value that substantially approaches the center of the above relative expression, and the substantially ideal configurations are provided.

Also, the cylindrical lens surfaces having a negative refractive force and formed on the front window 6 are shaped in a complete coincident configuration having concave and convex reverse to those of the cylindrical lens surface provided on the zoom panel 5 as shown in the figure. Because the refractive forces of the cylindrical lenses are just canceled in the case where they are in close contact with each other, the light beam is emitted while the characteristic where the light is converged within the optical prism 4 is maintained, thereby being capable of forming an optical system extremely excellent in efficiency.

In this embodiment, the configuration of the respective cylindrical lenses are formed in an aspheric shape with no spherical aberration. For that reason, the component outgoing from the center of the light source can be diffused with a high efficiency without being totally reflected by the cylindrical lens surfaces. Also, since the cylindrical lenses are formed in a shape where the spherical aberration is corrected as described above, if the light emitting light source is sufficiently small with respect to the optical prism, the optical system extremely excellent in efficiency can be structured.

Subsequently, a second embodiment of the present invention will be described with reference to FIGS. 8 to 10.

The second embodiment is a modified example in which the configuration of the light outgoing surface of the optical prism is changed, the outgoing surface convex lens configuration of the zoom panel is changed, and the concave lens configuration of the front window corresponding to the convex lens configuration is changed with respect to the first embodiment. The second embodiment is characterized in that the lighting optical system is reduced in the optical axial direction, the amount of movement with a variation in the irradiating angle is reduced, and the variation in the irradiating angle equivalent to that in the first embodiment is conducted.

Also, the second embodiment is characterized in that a movable portion at the time of zooming is structured by the front window which is a final end portion of the lighting optical system. With the movable portion thus structured by the final end surface, a surplus space is not required at the receiving time, and the device can be structured with the minimum volume. Other structures are identical with those in the first embodiment, and the convex lens surface configuration of the cylindrical surfaces of the zoom panel is applied with an aspheric cylindrical surfaces whose spherical aberration is corrected.

Figure 8:
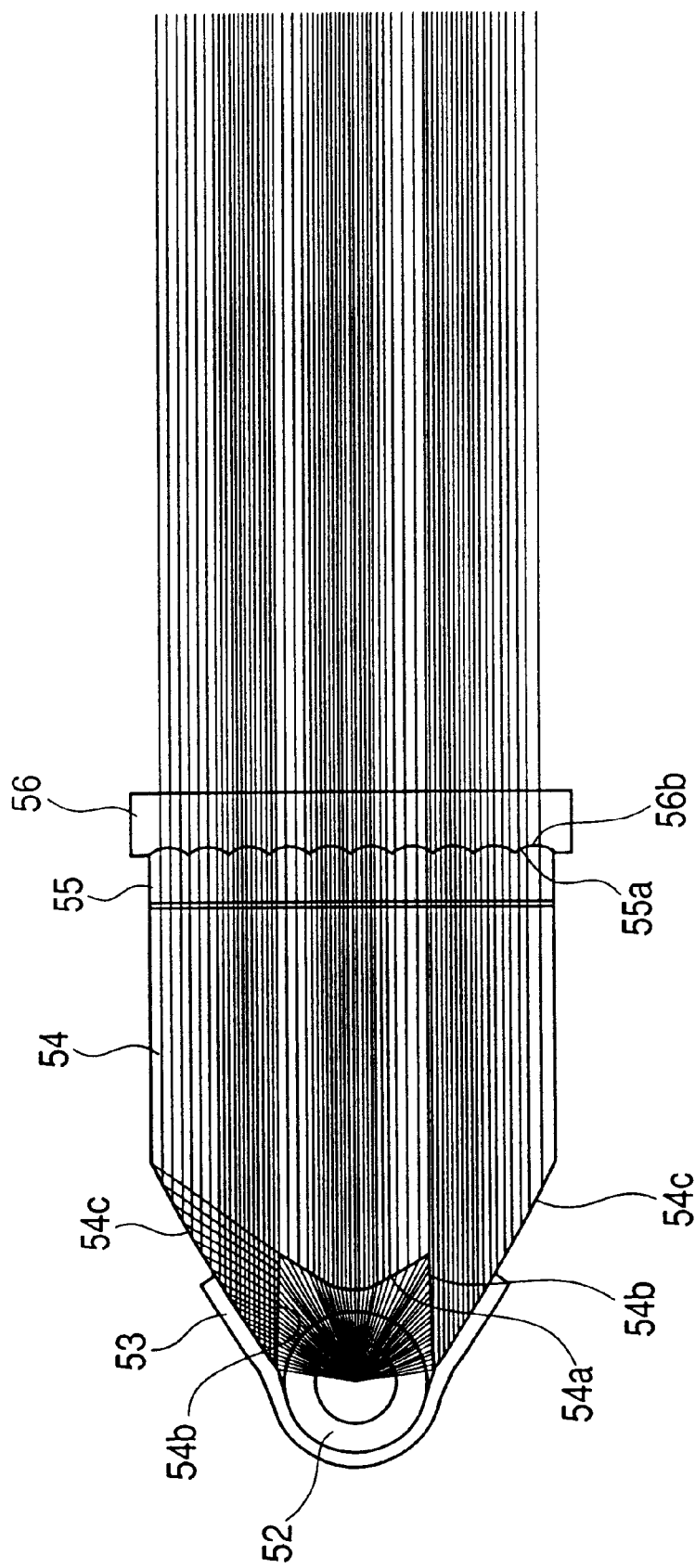
FIG. 8 is a longitudinal cross-sectional view showing a light beam distribution in a converging state in the discharge tube radial direction of the flash emitting device in accordance with a second embodiment of the present invention.
Figure 9:
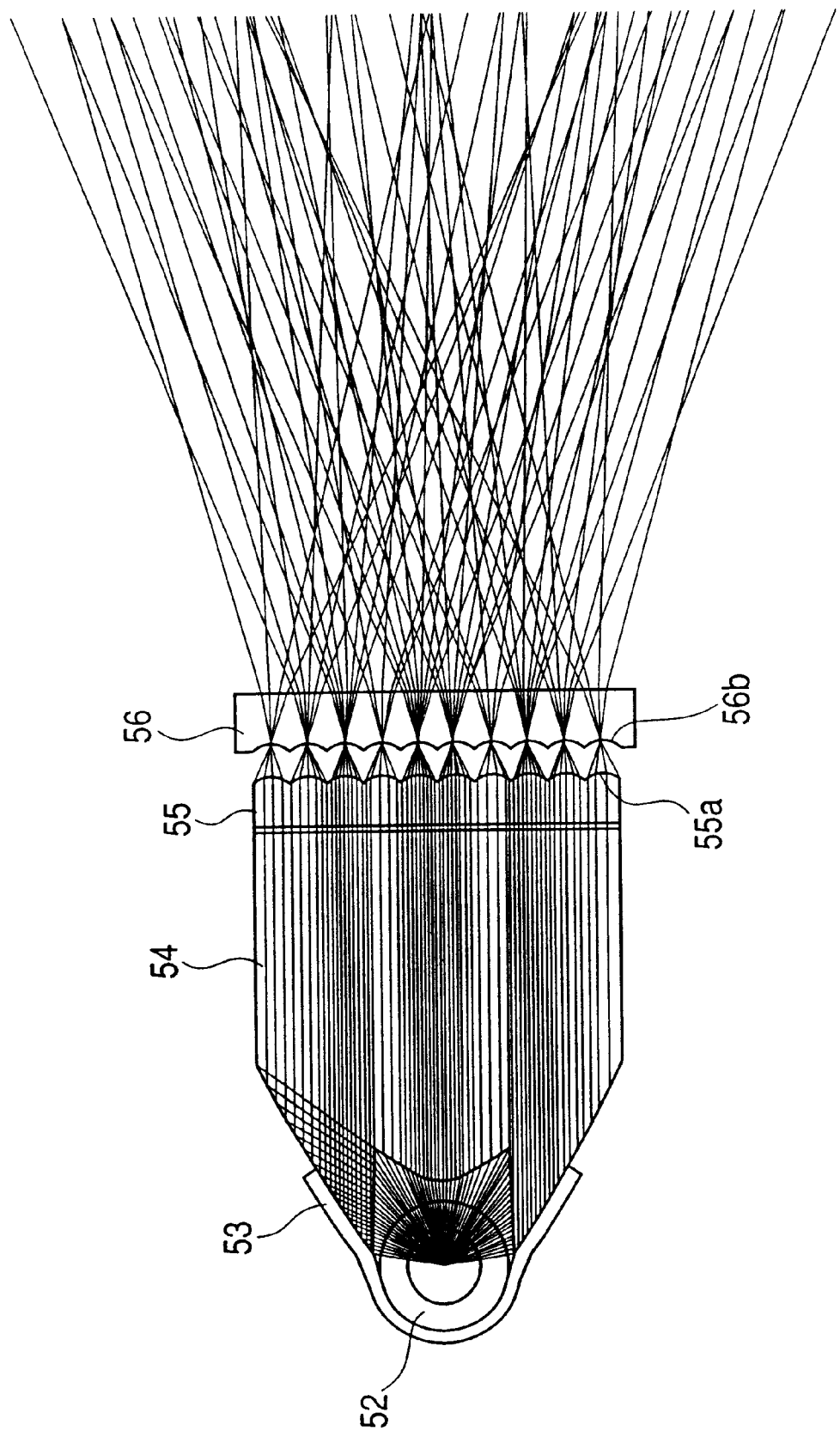
FIG. 9 is a longitudinal cross-sectional view showing a light beam distribution in a diverging state in the discharge tube radial direction of the flash emitting device in accordance with the second embodiment of the present invention.

In those figures, FIGS. 8 and 9 are longitudinal cross-sectional views showing the lighting optical system as in the first embodiment, respectively, in which FIG. 8 shows a state in which the irradiated state is narrowest and FIG. 9 shows a state in which the irradiated state is broadest. Also, FIG. 10 shows a plan view of the lighting optical system and shows the outgoing surface configuration of the optical prism. In the figures, reference numeral 52 denotes a flash discharge tube, 53 is a reflector, and 54 is an optical prism.

Figure 10:
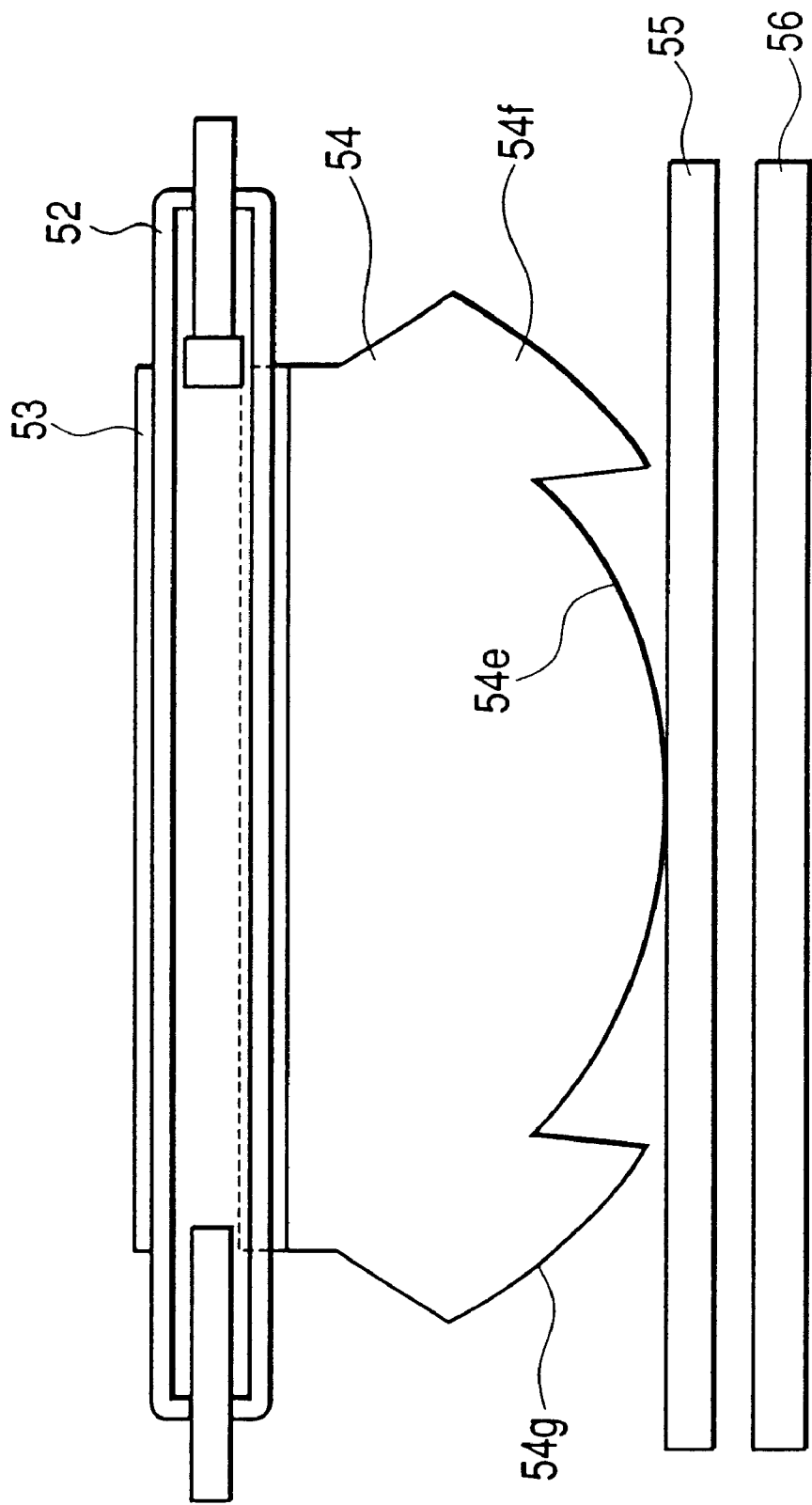
FIG. 10 is a plan view showing an optical system of the flash emitting device in accordance with the second embodiment of the present invention.

As shown in FIG. 10, the optical prism 54 is different from that in the first embodiment in that the light outgoing surface is made up of three curved surfaces consisting of a center portion 54e and peripheral portions 54f and 54g. In this way, the outgoing surface configuration is divided to relatively suppress a loss of the light amount, so that the lighting optical system can be reduced in the outgoing optical axial direction so as to be downsized. Also, reference numeral 55 denotes a fixed zoom panel and 56 is a movable front window that operates to vary the irradiating angle.

In this example, the respective configurations of cylindrical lenses 55a of the zoom panel 55 that forms a diffusion portion and cylindrical lenses 56b of the front window 56 having the configuration which coincides with that of the cylindrical lenses 55a and having a negative refractive force are that the configurations of the first embodiment are analogously reduced to substantially the half. With this structure, assuming that the light beam outgoing from the center of the light source is made substantially in parallel with the outgoing optical axis by an incident surface 54b and a total reflection surface 54c of the optical prism 54, an irradiating angle variation substantially equivalent to the irradiating angle variation of the first embodiment can be conducted by substantially the half of the movement amount of the first embodiment.

If actual numeric values are substituted for, assuming that the maximum clearance of the lenses is L, the paraxial focal distance of the lenses is D, and the pitches of the respective cylindrical lenses are P, L=0.75 mm, D=0.75 mm and P=0.75 mm.

The maximum clearance L of the lenses approaches the lower limit of expression (3), and a relation between the paraxial focal distance D of the lenses and the pitches P of the respective cylindrical lenses takes substantially the center value of expression (4) as in the first embodiment.

As described above, since the configuration of the concave and convex cylindrical lenses that constitute the diffusing portion is analogously changed, the maximum moving distance of the lens can be changed without changing the light distribution characteristic. In this case, the sensitivity of the respective elements in the optical system with respect to the light distribution change becomes high, and the vertical relative displacement or inclination of those lenses are exhibited as a large change in the light distribution characteristic.

However, if a design is conducted sufficiently mechanically taking the above matters into consideration, the irradiating angle variable lighting optical system which can remarkably change the irradiating angle variation by the necessary minimum amount of movement can be designed.

Figure 11:
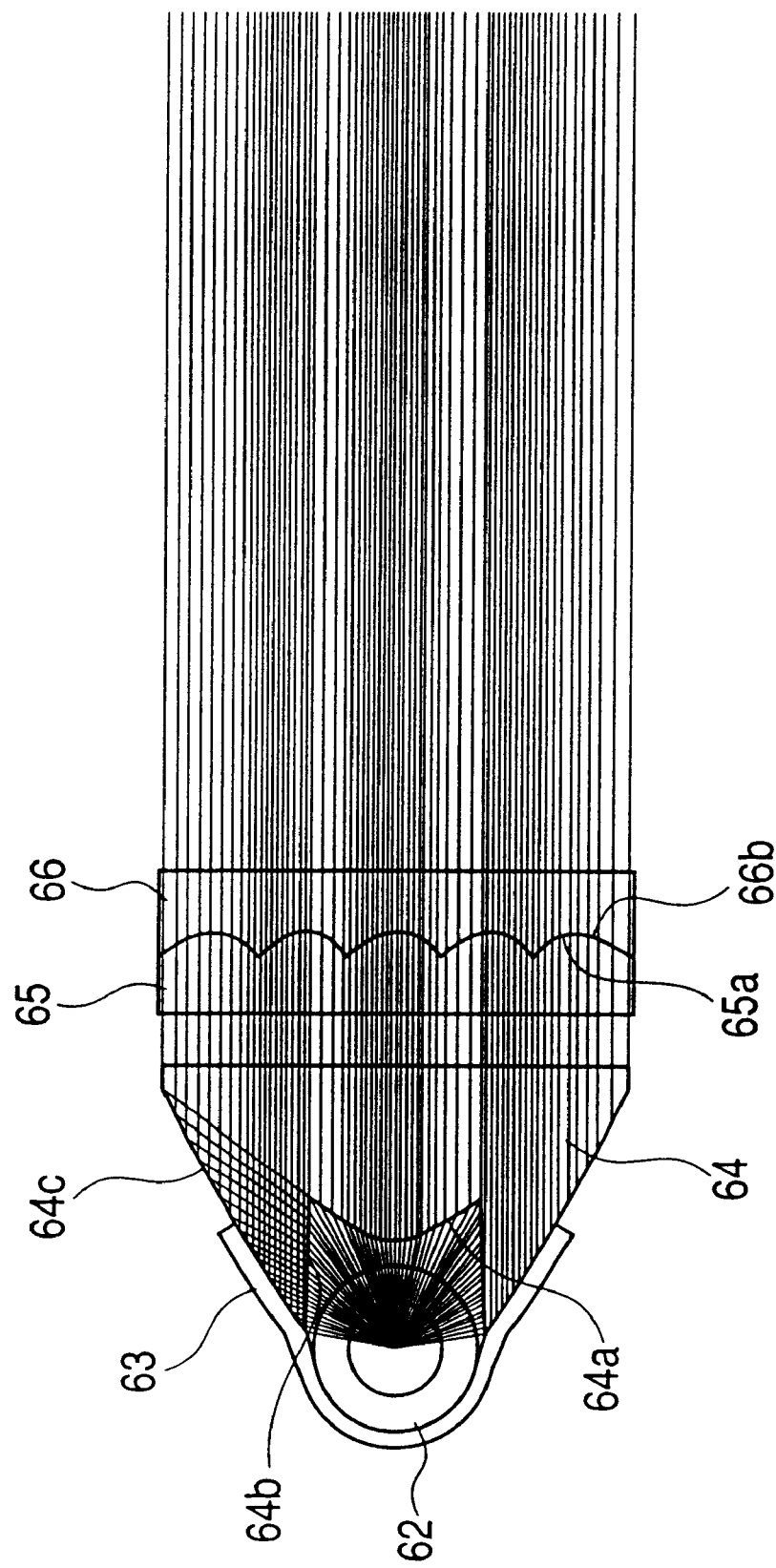
FIG. 11 is a longitudinal cross-sectional view showing a light beam distribution in a converging state in the discharge tube radial direction of the flash emitting device in accordance with a third embodiment of the present invention.
Figure 12:
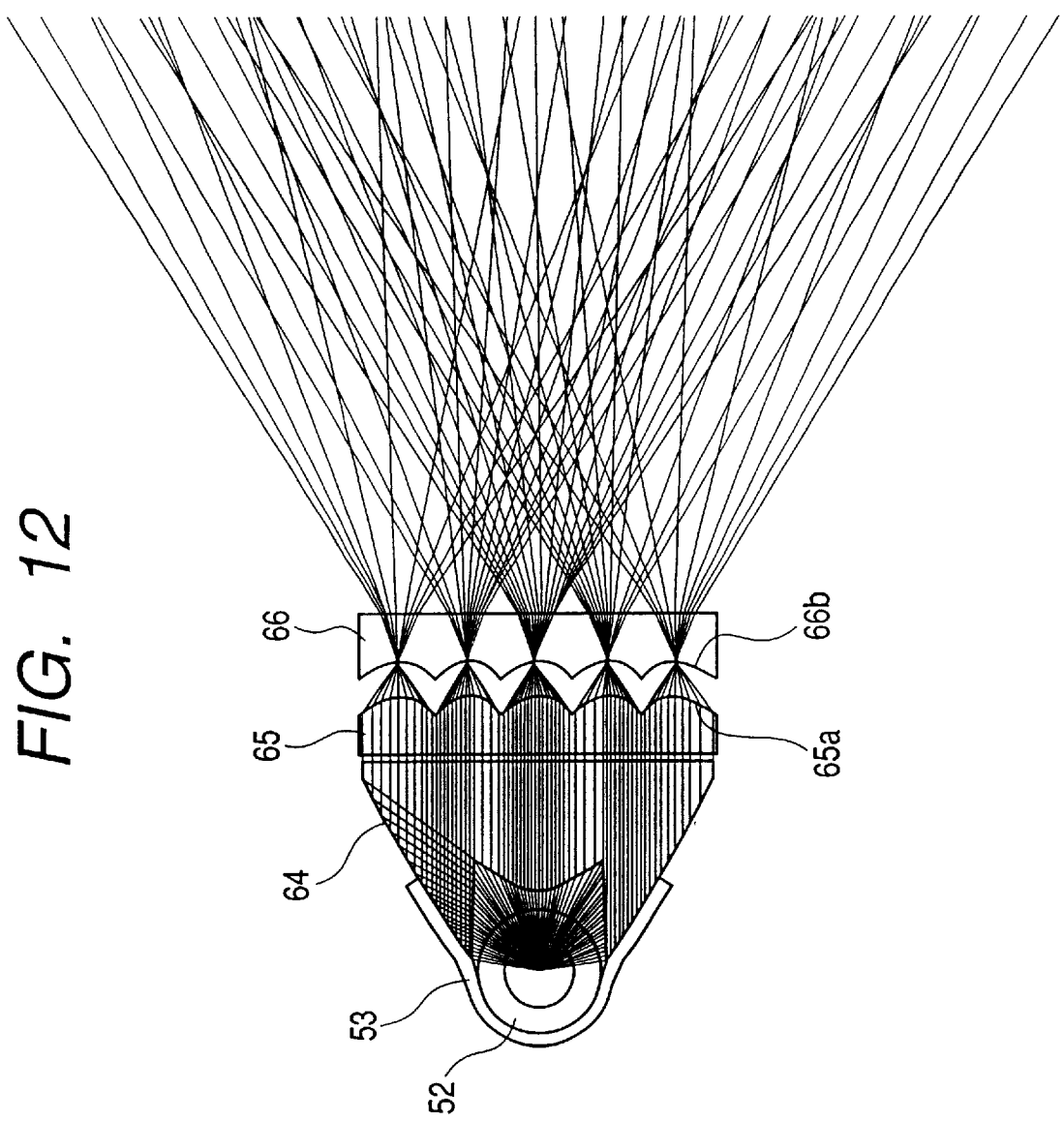
FIG. 12 is a longitudinal cross-sectional view showing a light beam distribution in a diverging state in the discharge tube radial direction of the flash emitting device in accordance with the third embodiment of the present invention.

Subsequently, a third embodiment of the present invention will be described with reference to FIGS. 11 to 13. The third embodiment is a modified example different from the second embodiment in that the optical prism is further downsized, and the convex lens configuration of the zoom panel 65 and the concave lens configuration of the front window 66 corresponding to the convex lens configuration are changed with respect to the second embodiment. The third embodiment is characterized in that the amount of movement with a variation in the irradiating angle is minimized, and the variation in the irradiating angle larger than that in the first embodiment is conducted. Other structures are identical with those in the first embodiment, and the convex lens surface configuration of the cylindrical surfaces is applied with an aspheric cylindrical surfaces whose spherical aberration is corrected.

Figure 13:
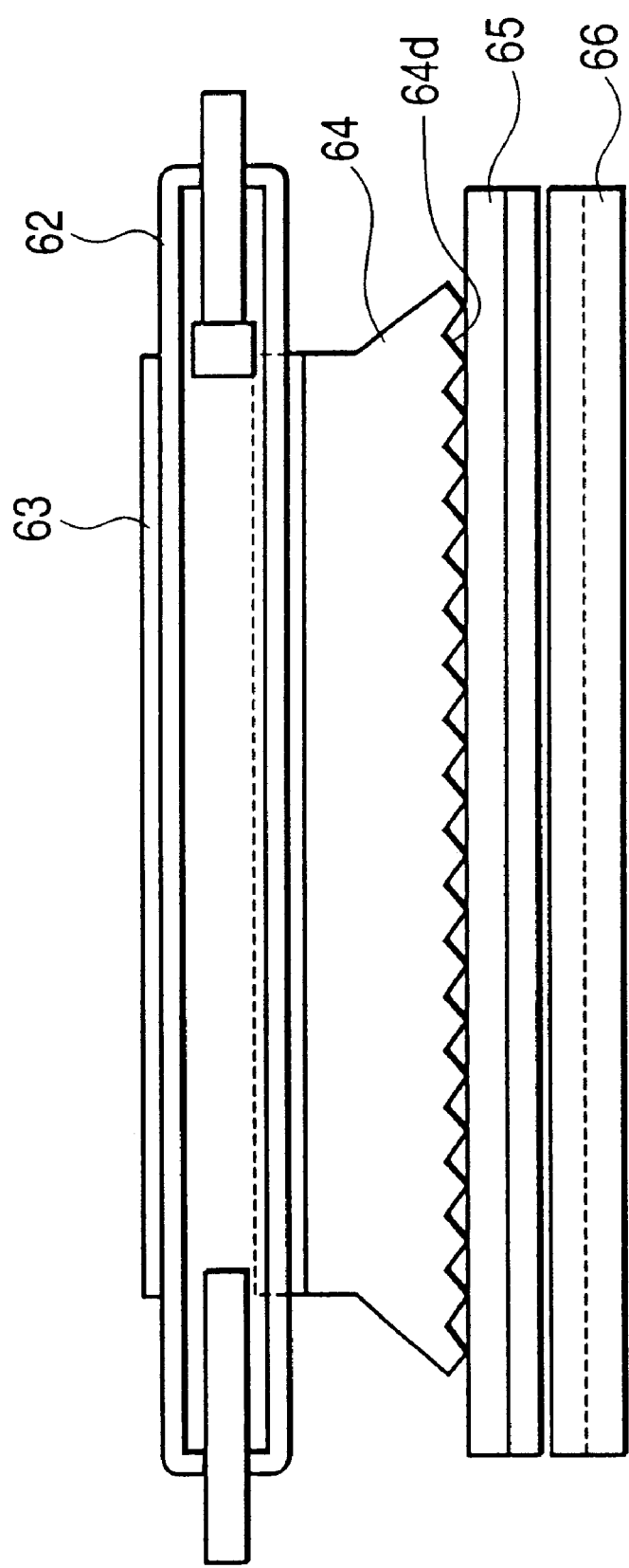
FIG. 13 is a plan view showing an optical system of the flash emitting device in accordance with the third embodiment of the present invention.

The basic structure is that a plurality of prism surfaces are formed on a light outgoing surface 64d of the optical prism 64 in a direction perpendicular to the longitudinal direction of a flash discharge tube 62 as shown in FIG. 13, and an outgoing light from the flash discharge tube 62 is converged at a distance near a light source. Also, at the same time, the diffusion of the converged light in a lateral direction of the flash discharge tube 62 is to enhance a refractive force in a state where the pitches of the cylindrical lenses formed on the light outgoing surface 65a of the zoom panel 65 are made identical with each other with respect to the first embodiment. Because an unnecessary totally reflected light occurs when the refractive force is simply heightened, the lens surface is so shaped as to correct the spherical aberration. As shown in the figure, it is understood that a great irradiating angle variation is conducted by substantially the half of the movement amount of the first embodiment.

As described above, even if the amount of movement with a variation in the irradiating angle is extremely reduced, if correction is made by using the aspheric cylindrical lenses, a loss of the light amount due to total reflection is not produced, thereby being capable of controlling the converged light diffusion with a high efficiency. As shown in the figure showing a light beam trace according to this embodiment, although the light beam outgoing from the center of the light source is converged and diffused by the small amount of movement with a high efficiency, the light emitting portion of the light source has a given size, and if the size is too large with respect to the entire optical system, the totally reflected light by the light outgoing surface 65a of the optical prism is liable to occur.

Accordingly, the third embodiment can structure the lighting angle variable mechanism which is extremely effective in the case where the actual size of the light source is sufficiently small with respect to the entire optical system, or if the optical system is so structured as to have most preference to downsizing even if a loss of the light amount occurs to some degree.

If actual numeric values are substituted for, assuming that the maximum clearance of the lenses is L, the paraxial focal distance of the cylindrical lenses is D, and the pitches of the cylindrical lenses are P, L=0.75 mm, D=0.75 mm and P=1.50 mm.

The maximum clearance L of the lenses approaches the lower limit of expression (3), and a relation between the paraxial focal distance D of the cylindrical lenses and the pitches P of the cylindrical lenses takes substantially the lower value of expression (4). That is, the largest irradiating angle variation can be made by the smallest amount of movement.

Figure 14:
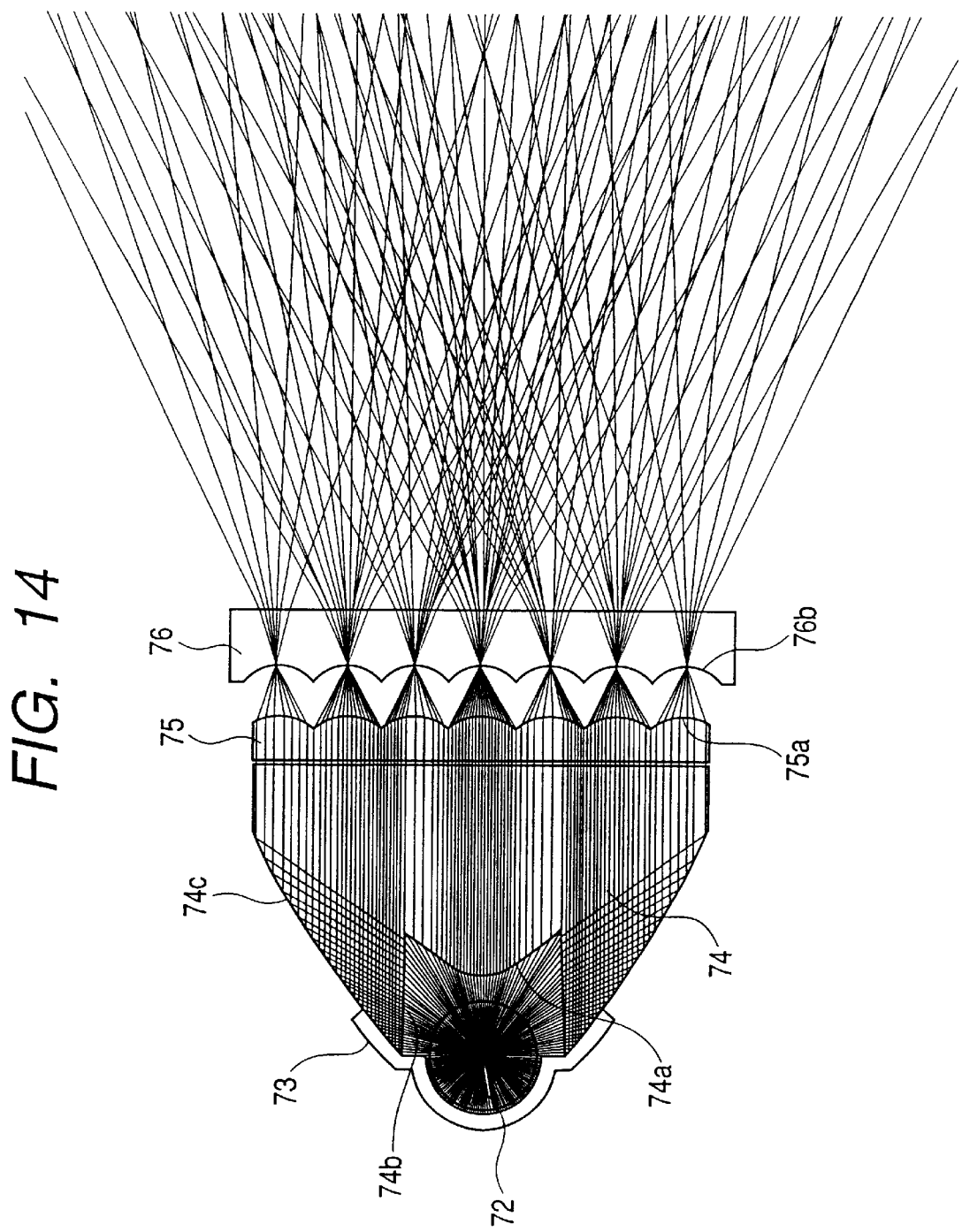
FIG. 14 is a longitudinal cross-sectional view showing a light beam distribution in a diverging state in the discharge tube radial direction of a flash emitting device in accordance with a fourth embodiment of the present invention.
Figure 15:
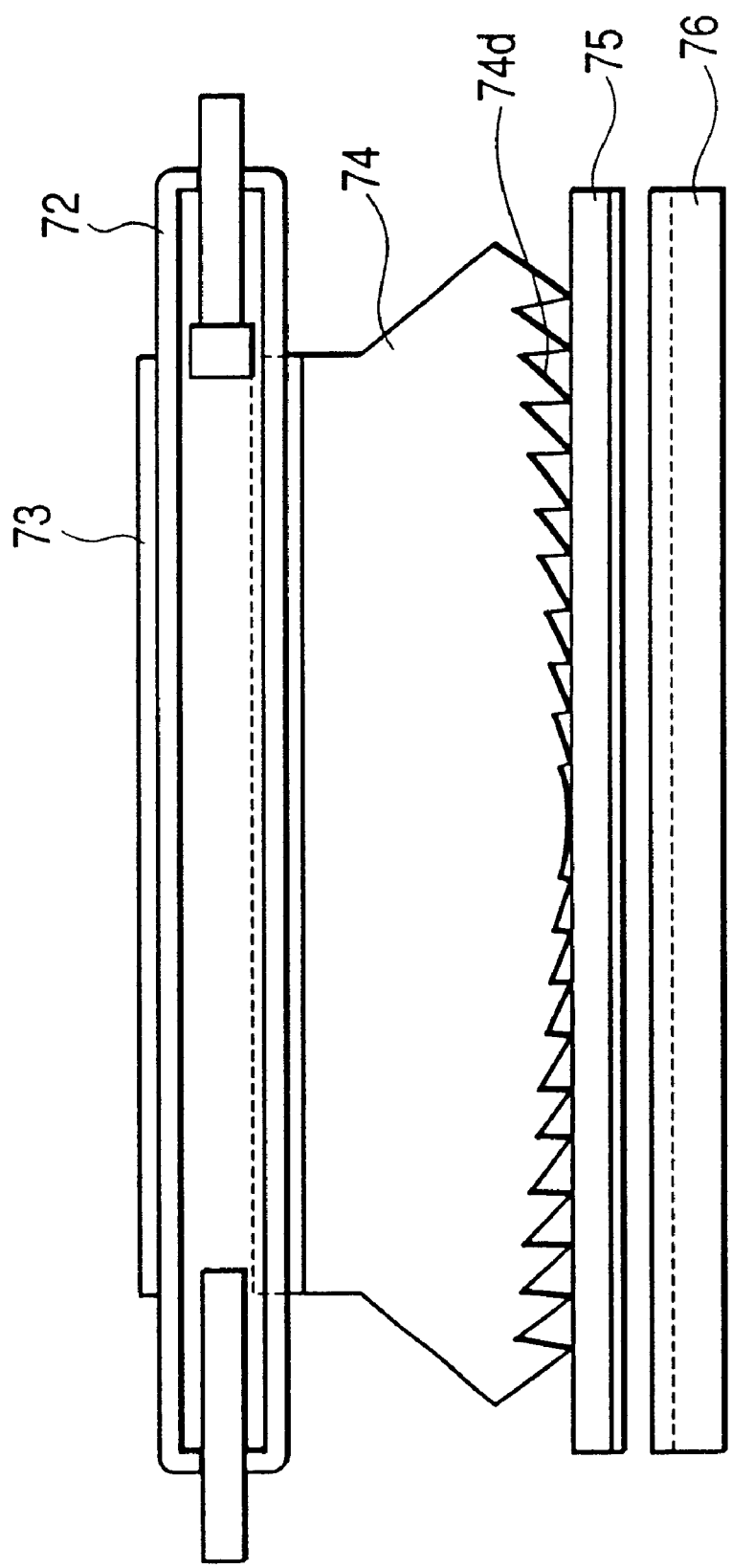
FIG. 15 is a plan view showing an optical system of the flash emitting device in accordance with the fourth embodiment of the present invention.

Subsequently, the fourth embodiment of the present invention will be described with reference to FIGS. 14 to 16. FIG. 14 is a cross-sectional view of a flash discharge tube 72 in a radial direction thereof, and FIG. 15 is a cross-sectional view of the flash discharge tube 72 in an axial direction thereof.

The names and functions of the respective members are substantially the same as those in the respective embodiments, and are denoted by the corresponding reference numerals. In particular, in the fourth embodiment, the convex lens configuration of the outgoing surface of the zoom panel 75 is improved, and the concave lens configuration of the front window 76 corresponding to the convex lens configuration is also optimized in accordance with the convex lens configuration. With the structure of this embodiment, the light distribution of the wide state among the light distribution characteristics obtained by the irradiating angle variation can be unified.

In other words, in the first to third embodiment, there is structured that the spherical aberration of the cylindrical lenses is corrected so as to converge the light in a straight line. The light distribution characteristic thus obtained reduces the loss of the light amount caused by total reflection, and the light distribution characteristics substantially uniform over the necessary irradiated area are obtained. However, the illuminance on the peripheral portion is tended to be lower as compared with that on the center portion. In this embodiment, in order to improve the light distribution characteristics, in particular, the light distribution characteristics on the wide side which requires the uniformity, the configuration of the light outgoing surface of the zoom panel is particularly improved as will be described below.

First, as a basic view, it is assumed that the outgoing light from the light source is made in parallel with the outgoing optical axis by refraction and total reflection surface of the optical prism with respect to the section of the flash discharge tube in the axial direction, the pitches of the respective cylindrical lens surfaces are sufficiently small, and all the arrived components have uniform distribution not depending on the position of the arrived outgoing surface. With this assumption, it can be assumed that the substantially uniform light beams which are in parallel with the outgoing optical axis are made incident for each of the respective cylindrical lens surfaces. Then, since the components which are in parallel with the outgoing optical axis are uniformly distributed for each of the cylindrical lenses, the uniform light distribution characteristic can be obtained over the entire necessary irradiated area.

In this embodiment, in a specific light distribution method, the configuration of the respective cylindrical lens surfaces is regulated as follows:

First, a distance from the optical axis and an angle after the light beam passed through the cylindrical lens are regulated so as to provide a given relation on the basis of the center of the optical axis of the respective cylindrical lenses. In particular, in this embodiment, as shown in FIG. 16, the following proportional relation is satisfied between a distance m between the center of the respective cylindrical lens optical axes and the outgoing position and the angle θ after the light beam passed through the cylindrical lens. That is, the relation is represented by the following general expression.

$$\theta = k \times m \quad (5)$$

where k is a proportional constant.

Hereinafter, a description will be given in more detail of the configuration of the light outgoing surface of an optical prism 74 with reference to FIG. 16.

Figure 16:
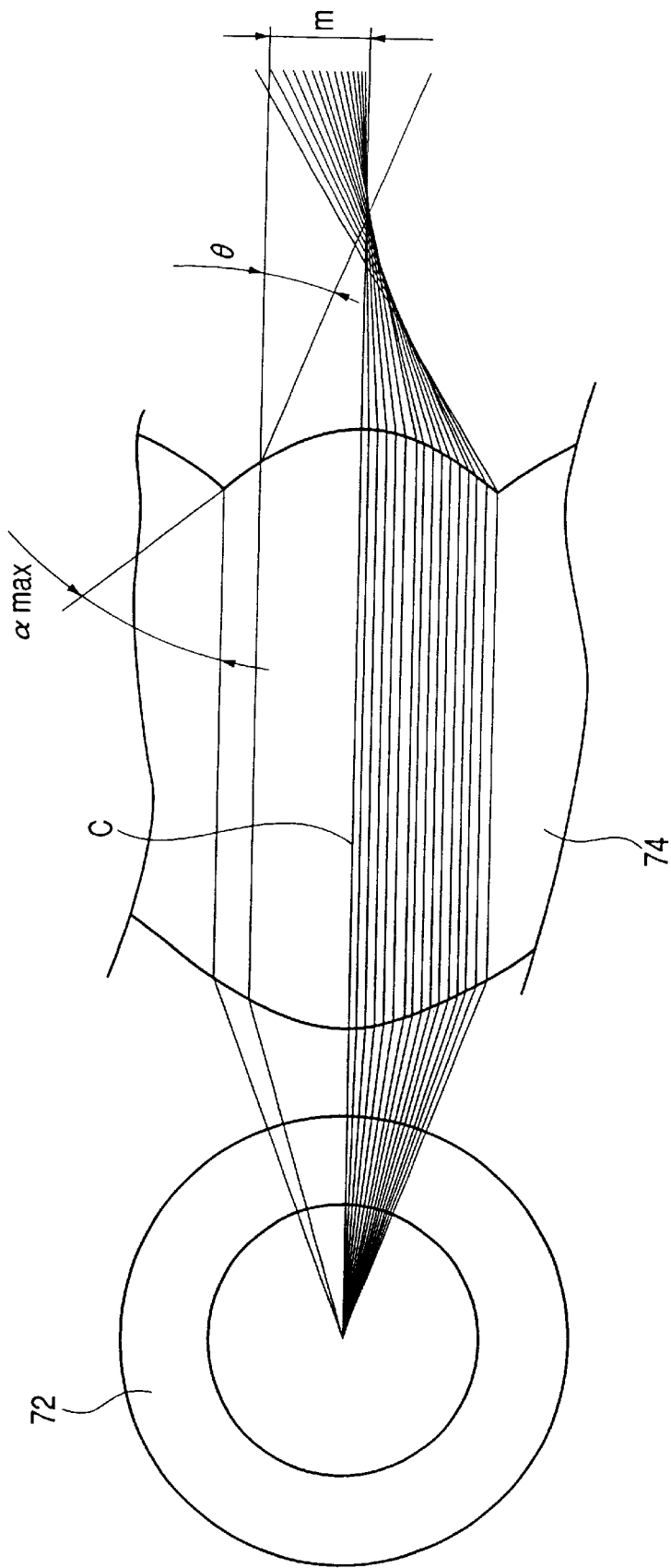
FIG. 16 is a partially longitudinal cross-sectional view showing a light emitting device in the discharge tube radial direction thereof for explanation of a light beam distribution in accordance with the fourth embodiment of the present invention.

FIG. 16 shows a partially enlarged portion of the irradiating angle variable lighting optical system shown in FIG. 14. In this example, the characteristics of one cylindrical lens surface in question will be described. In the figure, reference C denotes the optical axis of the cylindrical lens in question at this time, and the cylindrical lens is formed in a vertical symmetric configuration with respect to the axis. For simplification, the general expression with respect to the upper surface of the center of the optical axis and the actual light beam trace with respect to the lower surface will be described.

The light beam outgoing from the light source is converted into a light beam which is substantially in parallel with the optical axis due to the refraction by the incident surface as shown in the figure or the reflection by the total reflection surface not shown. Thereafter, the light beam is refracted by the light outgoing surface and converted into a given angle component. In this situation, the change is regulated by the above expression (5) and converted so as to provide the illumination distribution which is uniform on the irradiated surface.

Hereinafter, specific numeric values are used for description. In this embodiment, it is assumed that the pitches P of the cylindrical lenses are 1.5 mm as in the first and third embodiments. Also, the proportional constant k is 40. In this case, the distance to a position farthest from the center is 0.75 whereas the maximum angle after being converted is 30°. In an example shown in the figure, the surface configuration is set in such a manner that the components lower than the optical axis are shifted downward by 0.05 mm, and the angle is increased so as to be curved toward the optical axis side by 2° downward. With the above structure, because the light beam uniformly reaches the irradiated surface for each of the angular components, the ideal uniform light distribution characteristics can be obtained as a whole.

Subsequently, the structure of particularly unifying the light beam thus distributed to the uniform angular components on the wide side will be described. Although the light beam that has passed through the zoom panel 75 is unified as described above, there is a case in which the uniformity is not maintained depending on the configuration of the front window 76 positioned in the rear of the zoom panel 75, resulting an adverse influence. In other words, in the structures according to the above first to third embodiments, because the light beam that has passed through the zoom panel 75 is linearly converged in the vicinity of the optical axis of the respective cylindrical lenses which are weakest in the power, the effect of the concave lenses of the front window can be suppressed to the minimum by holding the position of the front window at the focal position of the respective cylindrical lenses of the zoom panel. However, when the respective cylindrical lenses of the zoom panel are formed in the configuration of this embodiment, the light beam is not linearly converged but has a distribution having a given expanse. For that reason, in this embodiment, a plane portion is disposed in the vicinity of the center of the respective lens surfaces of the front window, and this structure can obtain the uniform light distribution characteristic without receiving the lens effect of the front window.

Also, in the fourth embodiment, the length of the optical system in the optical axial direction is reduced by forming the Fresnel lens surface on the light emitting surface 74d of the optical prism 74 as shown in FIG. 15, which is different from the first to third embodiments. Thus, the downsizing of the entire structure of the optical system can be realized.

Figure 17:
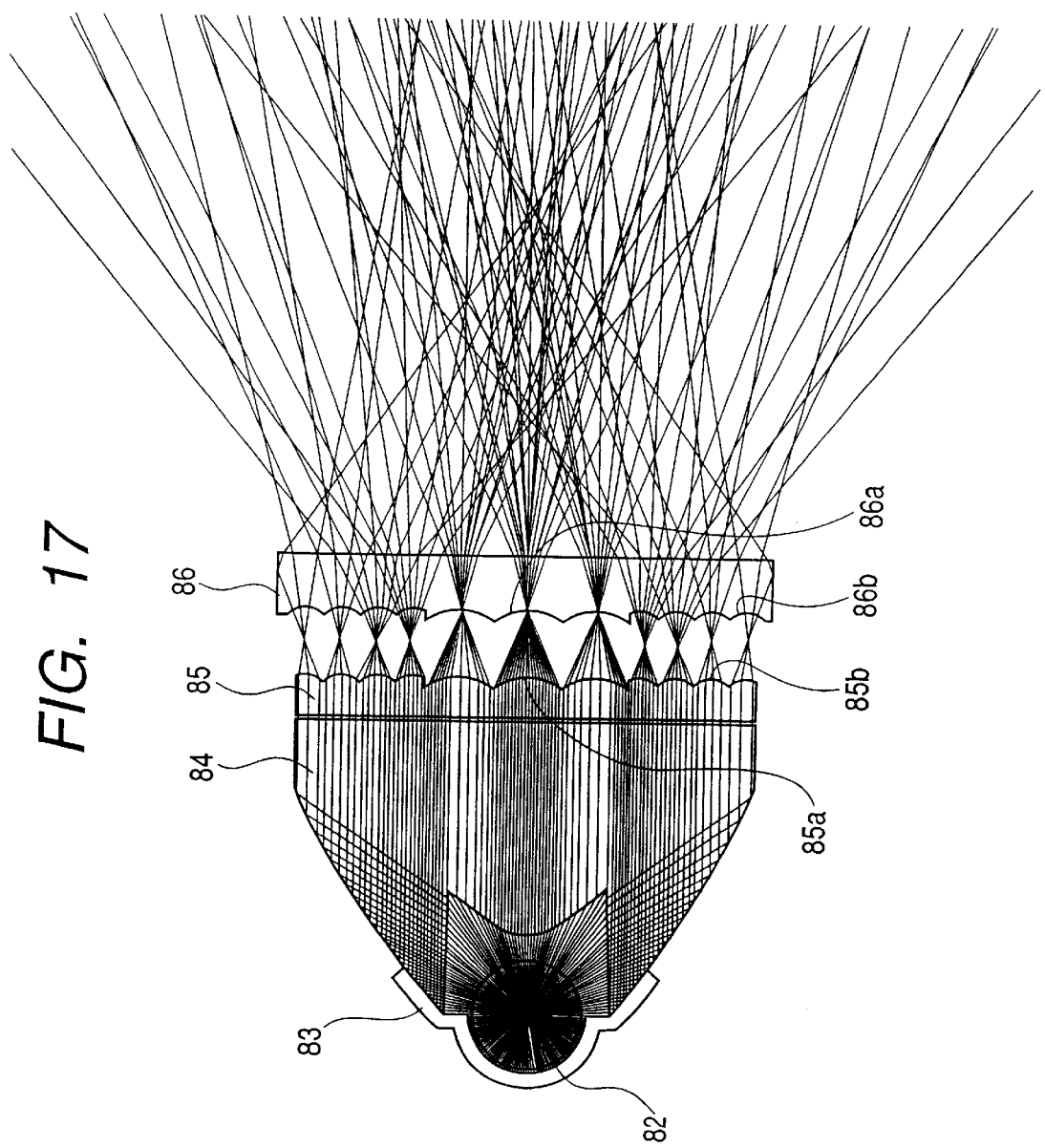
FIG. 17 is a longitudinal cross-sectional view showing a light beam distribution in a diverging state in the discharge tube radial direction of a flash emitting device in accordance with a fifth embodiment of the present invention.

Subsequently, a fifth embodiment of the present invention will be described with reference to FIG. 17. The fifth embodiment is characterized in that the convex lens configurations on the outgoing surface of the optical prism are made partially different. That is, the light outgoing surface configuration of the zoom panel 85 and the light incident surface configuration of the front window 86 are changed in the pitches and the refractive forces between the center portion and the peripheral portion thereof. Hereinafter, the fifth embodiment will be described with reference to FIG. 17.

As shown in the figure, aspherical cylindrical lenses 85a which are relatively wide in the pitches and relatively weak in the refractive force are formed in the center portion of the zoom panel 85, and aspherical cylindrical lenses 85b which are relatively narrow in the pitches and relatively strong in the refractive force are formed in the peripheral portion of the zoom panel 85.

An object of this embodiment is to obtain a uniform light distribution characteristic over the necessary irradiated area, in particular, to obtain the uniform light distribution in a state where the irradiated area is the broadest, and therefore the fifth embodiment is structured from a viewpoint different from that of the above embodiments. In order to achieve this object, the above structure is applied in this embodiment for the following reasons. First, although the component controlled at a position close to the light source is not largely spread if the size of the light source is small as described in the first embodiment, the controlled component includes not only a component which is made incident in parallel with the optical axis but also a component having a given expanse in correspondence with the size of the light source at a stage where the light beam reaches the outgoing surface of the optical prism if the size of the light source is large.

From the above fact, the component made incident from the incident surface of the optical prism front surface and directly refracted in parallel, that is, the component that reaches in the vicinity of the center portion of the optical prism outgoing surface becomes a component the actual light distribution of which is more spread than that of the component outgoing from the center of the light source shown in the figure. On the other hand, a component directed from the light source toward the sides (upper and lower directions in the figure) with respect to the optical axis is converted into the outgoing optical axis by total reflection, and because the light source and the reflection surface are positioned so that a distance therebetween is relatively far, the components spread due to the size of the light source are less than the above direct controlled components.

For that reason, in order to obtain the substantially equivalent light distribution characteristic over the entire light outgoing surface of the optical prism, it is necessary that the degree of diffusion in the peripheral portion of the optical panel is increased more than that in the center portion thereof. In the above fifth embodiment, in order to unify the irradiated distribution on the outgoing surface of the optical prism at the outgoing time, the divergence is changed depending on the locations, and in this embodiment, the divergence is changed by two kinds of optical characteristics. With this structure, not only the light distribution on the light outgoing surface but also the light distribution on the light irradiated surface can be uniformly controlled.

Also, in the above embodiment, the center portion and the peripheral portion is divided into the diffusing characteristics of two kinds of cylindrical lenses. However, the present invention is not limited to those two kinds of structures, but the refractive force of the cylindrical lenses may be gradually changed depending on the size of the light source and the degree of diffusion of the light that reaches the light outgoing surface of the optical prism, and this structure can obtain the more uniform light distribution characteristic.

In addition, in the above embodiment, although a plan view of the lighting optical system is not shown, a lens surface, a prism surface or a Fresnel lens surface which converges the light beam in the axial direction (longitudinal direction) of the flash discharge tube 82 are formed on the light outgoing surface of the optical prism 84 as in the first to fourth embodiments. The combination of the light converging method in the longitudinal direction of the light source with the diverging optical system disposed in front of the light source is not limited to the combination of the first to fourth embodiments, but another optical system may be combined.

The following embodiment is structured to have the light converging action in the longitudinal direction of the light source on the light outgoing surface of the optical prism by an arbitrary combination as in the above embodiment although a plan view of the optical system is not shown.

Also, although the above fifth embodiment shows only the diffusion state, the light converging state corresponds to a state where the powers of the respective cylindrical lenses which coincide with each other are offset by each other in a state where the zoom panel 85 and the front window 86 approach each other as in the first to third embodiments. In the following embodiments, although being not shown, a state where the zoom panel and the front window approach each other corresponds to the most light converging state, respectively.

Subsequently, a sixth embodiment of the present invention will be described with reference to FIG. 18. The sixth embodiment is characterized in that a part of the configurations of the outgoing surface of the optical prism is structured by a prism surface. That is, the center portion outgoing surface configuration of the zoom panel 95 and the center portion incident surface configuration of the front window 96 are formed of aspheric cylindrical surfaces, and the peripheral portion is formed of prism surfaces.

Hereinafter, this embodiment will be described with reference to FIG. 18.

Figure 18:
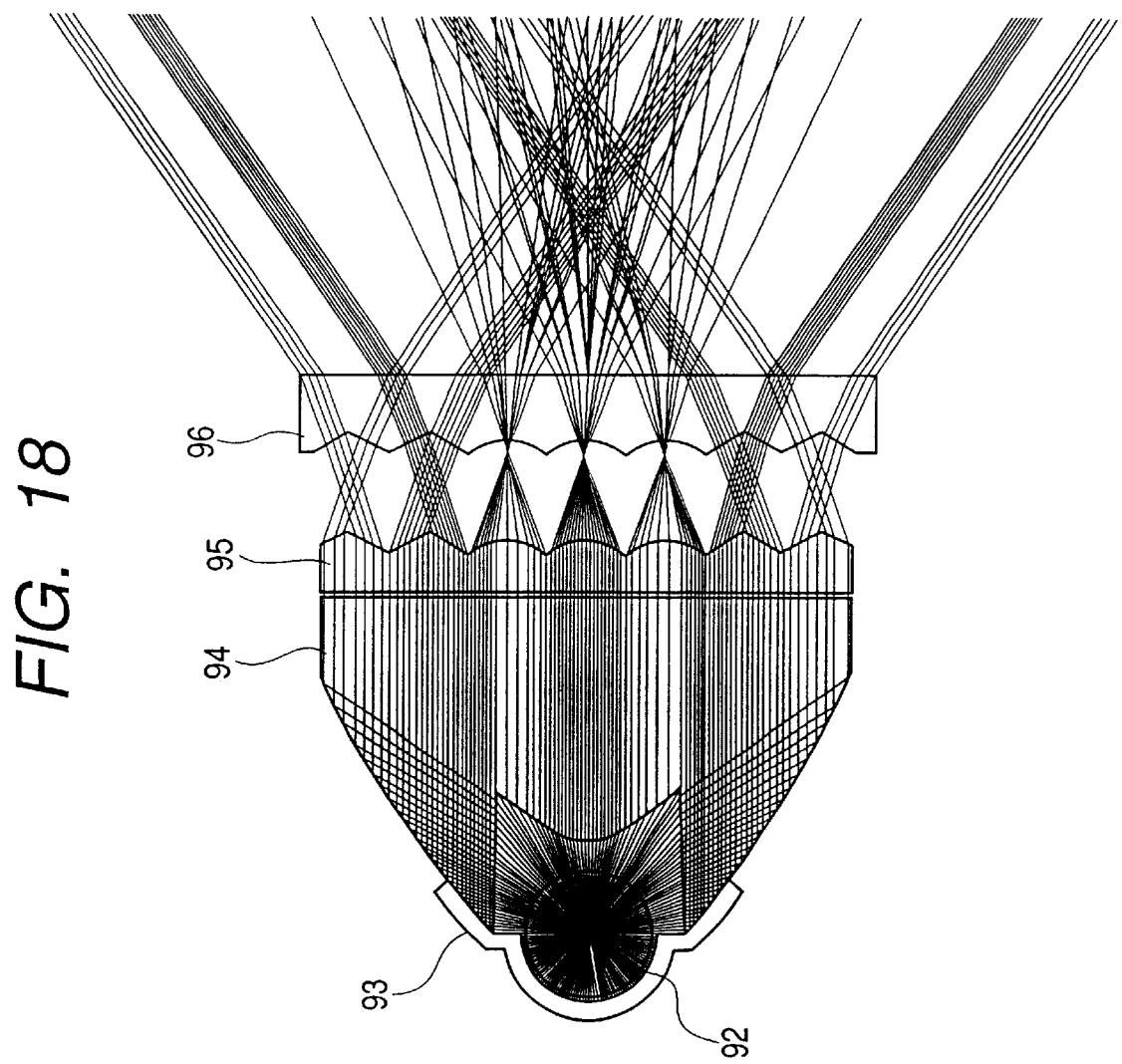
FIG. 18 is a longitudinal cross-sectional view showing a light beam distribution in a diverging state in the discharge tube radial direction of a flash emitting device in accordance with a sixth embodiment of the present invention.

FIG. 18 shows a diverging state. As shown in the figure, it is understood that a component corresponding to the prism portion is largely angularly converted.

As described in the fifth embodiment, if the component that reaches the peripheral portion has the same refractive force as that of the center portion, the rate of a change in the divergence of the peripheral portion is small, and a larger change of the divergence is required. Accordingly, in this embodiment, there is used a prism surface which is large in a change of the divergence on the peripheral portion of the light outgoing surface of the optical prism. In this way, because the components in the optical direction can be extremely changed by using the optical prism, the distribution intense in illumination which is liable to remain in the vicinity of the center in the diverging state can partially go around the peripheral portion of the necessary irradiated area, thereby being capable of obtaining the uniform light distribution as a whole.

It appears from the trace example of the light beam outgoing from the center of the light source shown in the figure that the light distribution is nonuniform, but in fact, because the size of the light source is large as compared with the entire configuration of the optical system, the light beam is irradiated onto a portion other than a portion shown in the figure, and the uniform light distribution is obtained as a whole.

Also, a state where the zoom panel 85 and the front window 86 approach each other comes to the most converging state although being not shown. The light source outgoing from the center of the light source is converted into a component which is substantially in parallel with the optical axis by the optical prism 84, and because the respective refractive forces of the cylindrical lenses and the prism surface formed on the light outgoing surface of the zoom panel 85 are canceled by the corresponding surfaces formed so as to coincide with the front window 86, the light converging state is maintained and reaches the irradiated surface.

Subsequently, a seventh embodiment of the present invention will be described with reference to FIGS. 19 to 22. The seventh embodiment is characterized in that a negative refractive force for canceling the refractive force of the cylindrical lenses formed on the zoom panel according to the first embodiment is formed on the outgoing surface side of the front window. If the size of the light source is sufficiently smaller than the entire optical system, even if the light outgoing surface configuration of the zoom panel does not always coincide with the configuration of the front window, the optical system substantially equivalent to those of the above respective embodiments can be obtained. Hereinafter, this embodiment will be described in more detail with reference to FIGS. 19 to 22.

Figure 19:
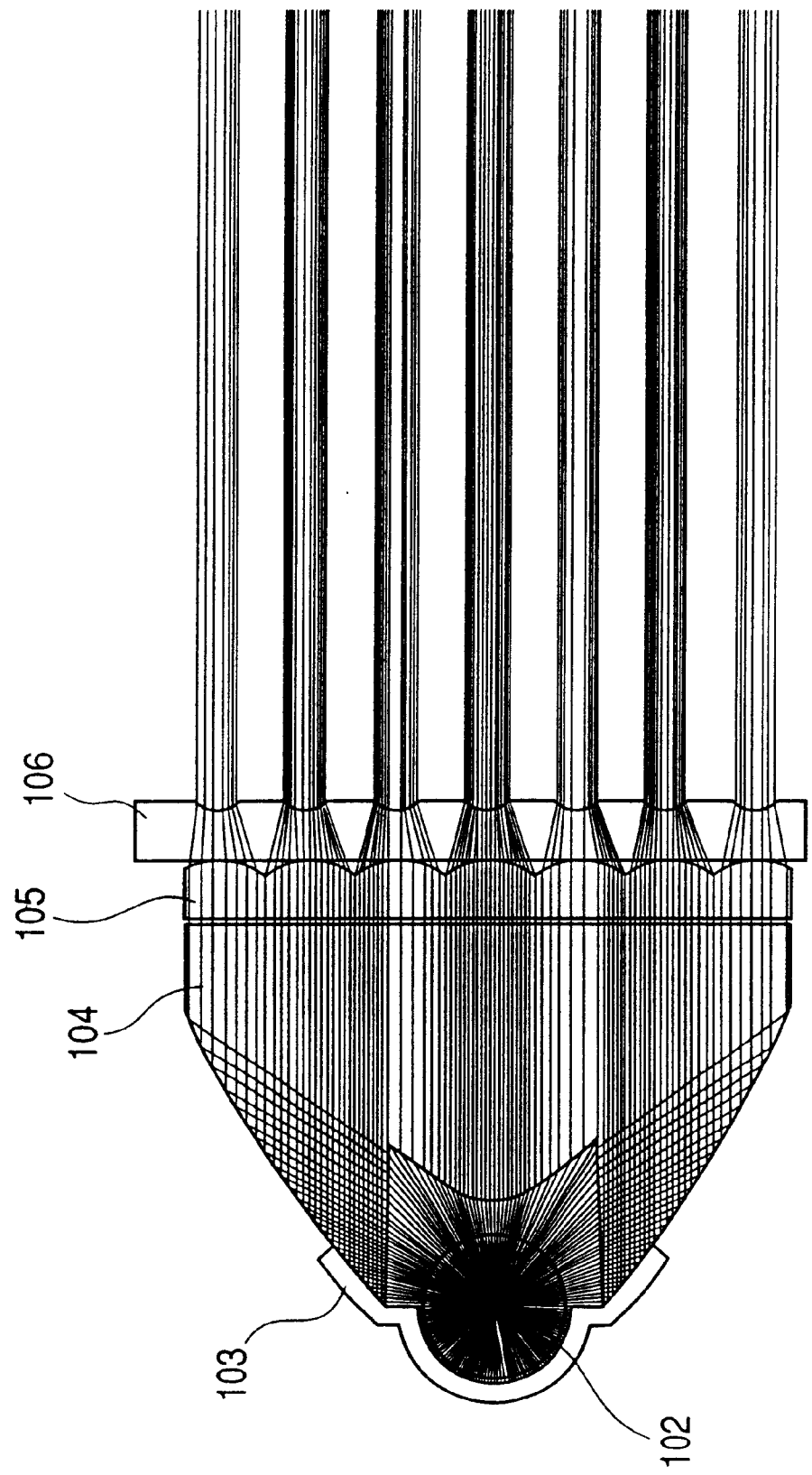
FIG. 19 is a longitudinal cross-sectional view showing a light beam distribution in a converging state in the discharge tube radial direction of a flash emitting device in accordance with a seventh embodiment of the present invention.

FIG. 19 is a diagram showing a converging state in accordance with the seventh embodiment. A zoom panel 105 and a front window 106 are in a close state, and in this state, the cylindrical surfaces having a negative refractive force are formed on the irradiated surface side of the front window 106 so as to cancel the converging characteristic of the zoom panel 105. With this structure, the light beam outgoing from the center of the light source is irradiated on the irradiated surface side of the optical panel as a plurality of band-like light beam.

Figure 20:
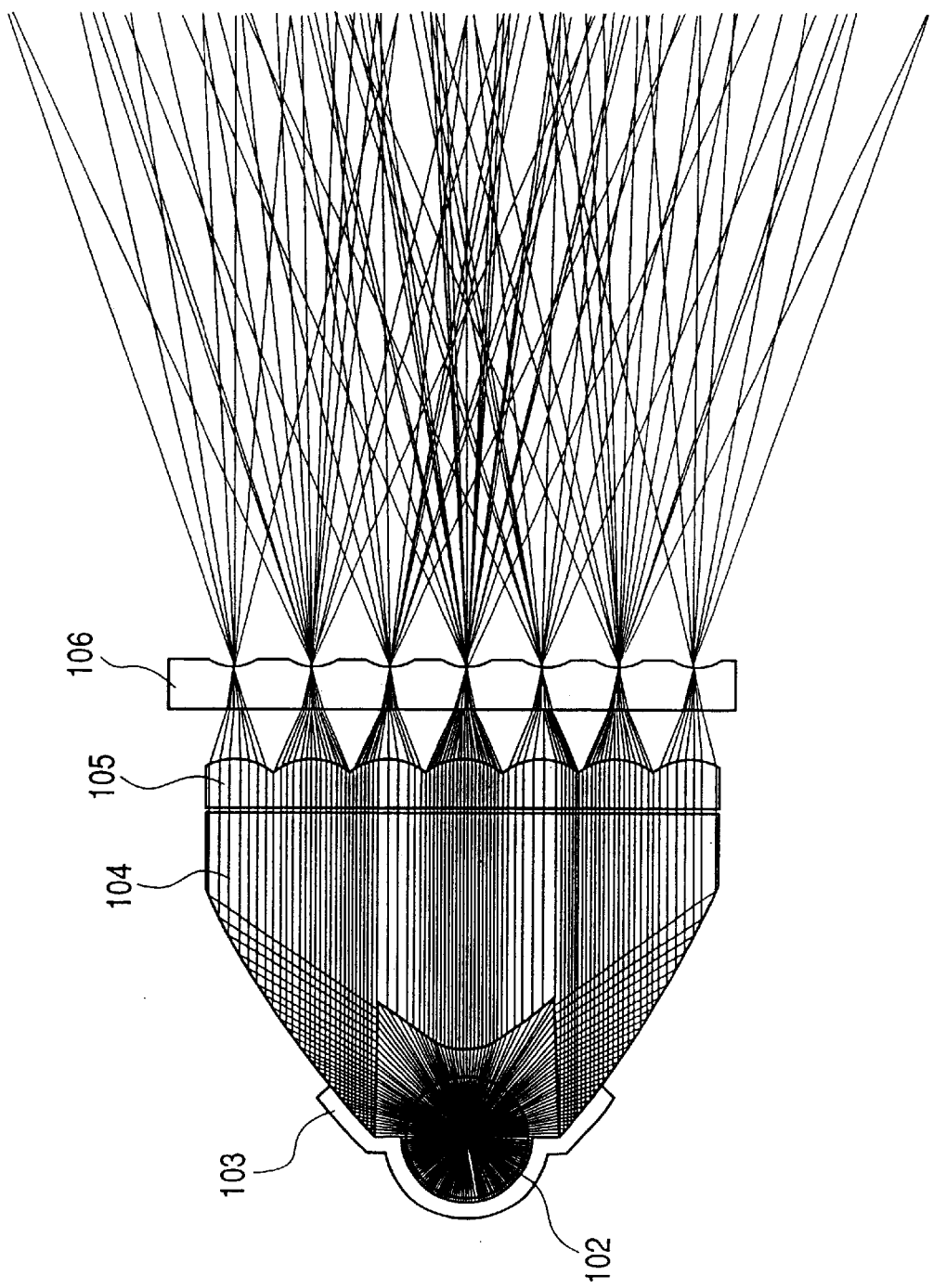
FIG. 20 is a longitudinal cross-sectional view showing a light beam distribution in a diverging state in the discharge tube radial direction of a flash emitting device in accordance with the seventh embodiment of the present invention.

On the other hand, FIG. 20 is a diagram showing a diverging state. Similarly, in this case, the amount of relative movement between the zoom panel and the front window is appropriately adjusted so that a desired light distribution characteristic can be obtained. In other words, the diverging state shown in FIG. 20 can be continuously changed from the converging state shown in FIG. 19 by moving the front window, and the continuous light distribution characteristic can be changed in accordance with the necessary irradiated area.

Figure 21:
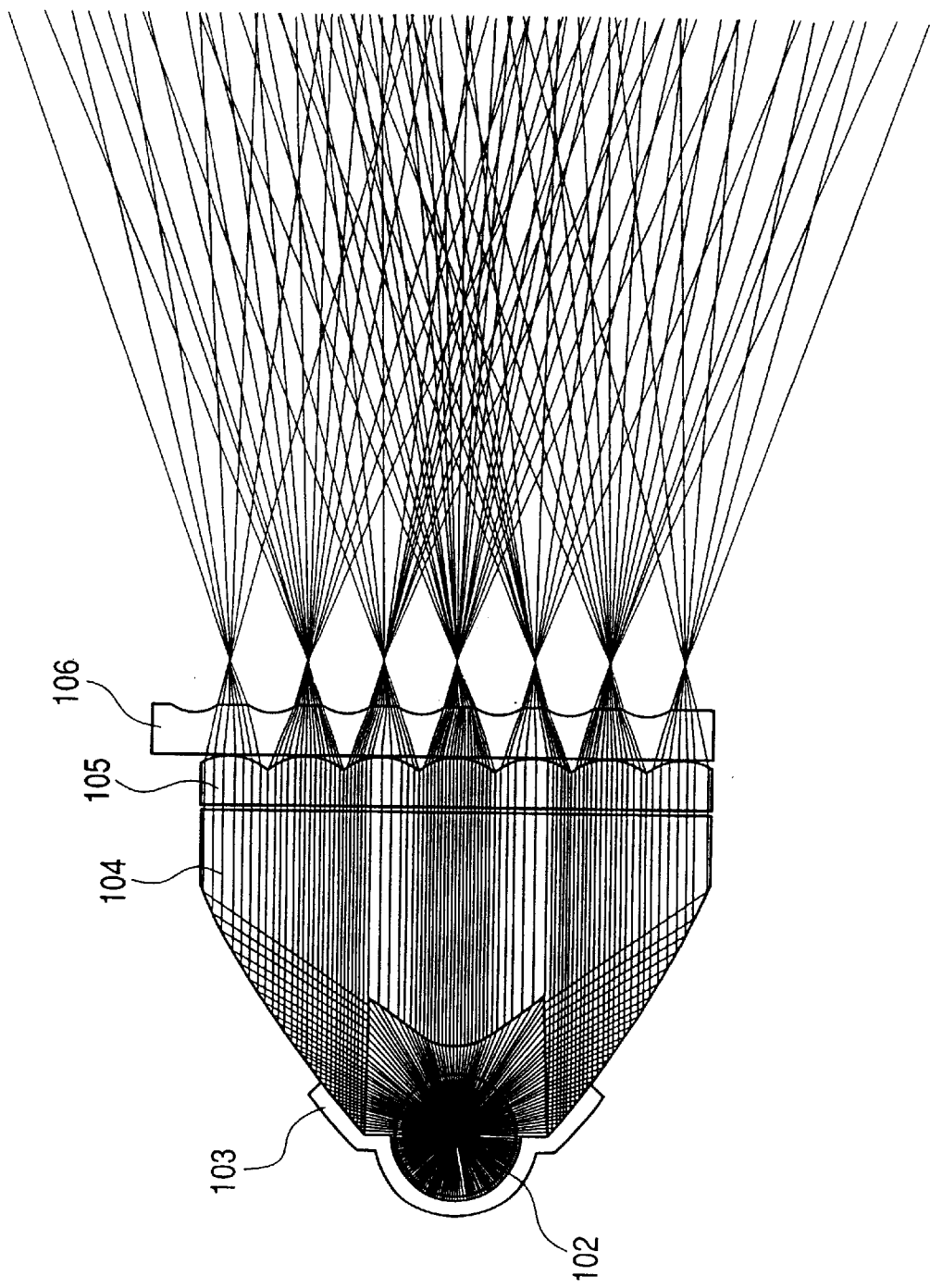
FIG. 21 is a longitudinal cross-sectional view showing a light beam distribution in another diverging state in the discharge tube radial direction of a flash emitting device in accordance with the seventh embodiment of the present invention.

Subsequently, another method for forming the diverging state in the seventh embodiment will be described with reference to FIG. 21. FIG. 21 forms the diverging state by moving the relative positional relation between the zoom panel 105 and the front window 106 in the vertical direction with respect to the outgoing optical axis. Even if the relative positional relation between the zoom panel 105 and the front window 106 is thus moved in the perpendicular to the outgoing optical axis, the diverging state substantially equivalent to the diverging state shown in FIG. 20 can be obtained. As is understood from the example shown in the figure, this is to utilize the fact that the diverging state can be formed by guiding the light beam to the plane portion of the front window 106. The method shown in FIG. 21 is largely different from that shown in FIG. 20 in that the state can be changed over between only two kinds of states consisting of the converging state and the diverging state, and the light distribution characteristic at the intermediate position is not suitable as the irradiating angle variation.

With the above structure, there is advantageous in that if two values of the convergence and divergence are changed over, the irradiating angle can be changed over in an extremely small space such as the vertical movement with respect to the optical axis. In the example shown in the figure, a surface of the front window on which the diverging state is formed is structured by a plane. However, the present invention is not always limited to this configuration, but a curved surface for obtaining the necessary light distribution characteristic may be formed or the plane and the curved surface may be combined together.

Subsequently, FIG. 22 will be described. This figure is the combination of the movements shown in FIGS. 20 and 21, and shows a state in which the positional relation between the zoom panel and the front window is moved in parallel with the optical axis while it is being moved in the vertical direction.

Figure 22:
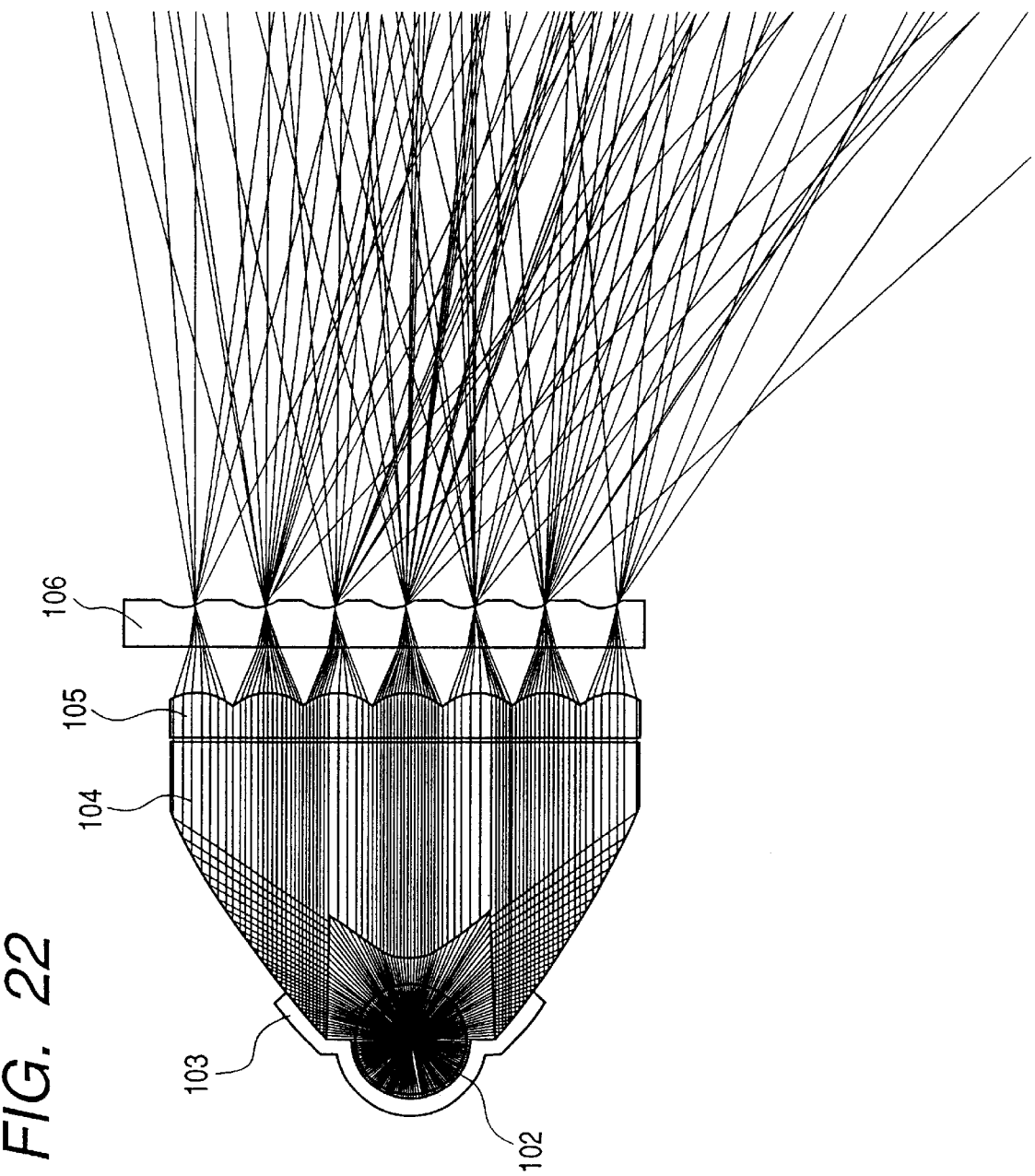
FIG. 22 is a longitudinal cross-sectional view showing a light beam distribution in still another diverging state in the discharge tube radial direction of a flash emitting device in accordance with the seventh embodiment of the present invention.

FIG. 22 shows that the optical panel is further moved upward by a given amount with respect to the state shown in FIG. 20, and as shown in the figure, the outgoing direction of the outgoing light beam can be inclined by maintaining the relation between the respective lenses in an eccentric state. In the example shown in the figure, a light emitting portion unit including the optical prism 104 and the zoom panel 105 is moved downward by 0.2 mm with respect to the front window 106, and the entire light distribution charac-teristic can be inclined downward by a given amount. Since the parallel movement and the vertical movement with respect to the outgoing optical axis are thus combined together, not only the expanse of the irradiated area but also the irradiating direction can be controlled to some degree.

The above change of the irradiating direction is not limited to this embodiment but can be achieved by the above other embodiments, likewise.

Also, in the above embodiment, the plurality of cylindrical lenses having the negative refractive force are formed on the irradiated surface side of the front window, but the present invention is not limited to this configuration. For example, the negative refractive force may be shared onto both surfaces of the front window 106 so as to obtain the equivalent effect.

Figure 23:
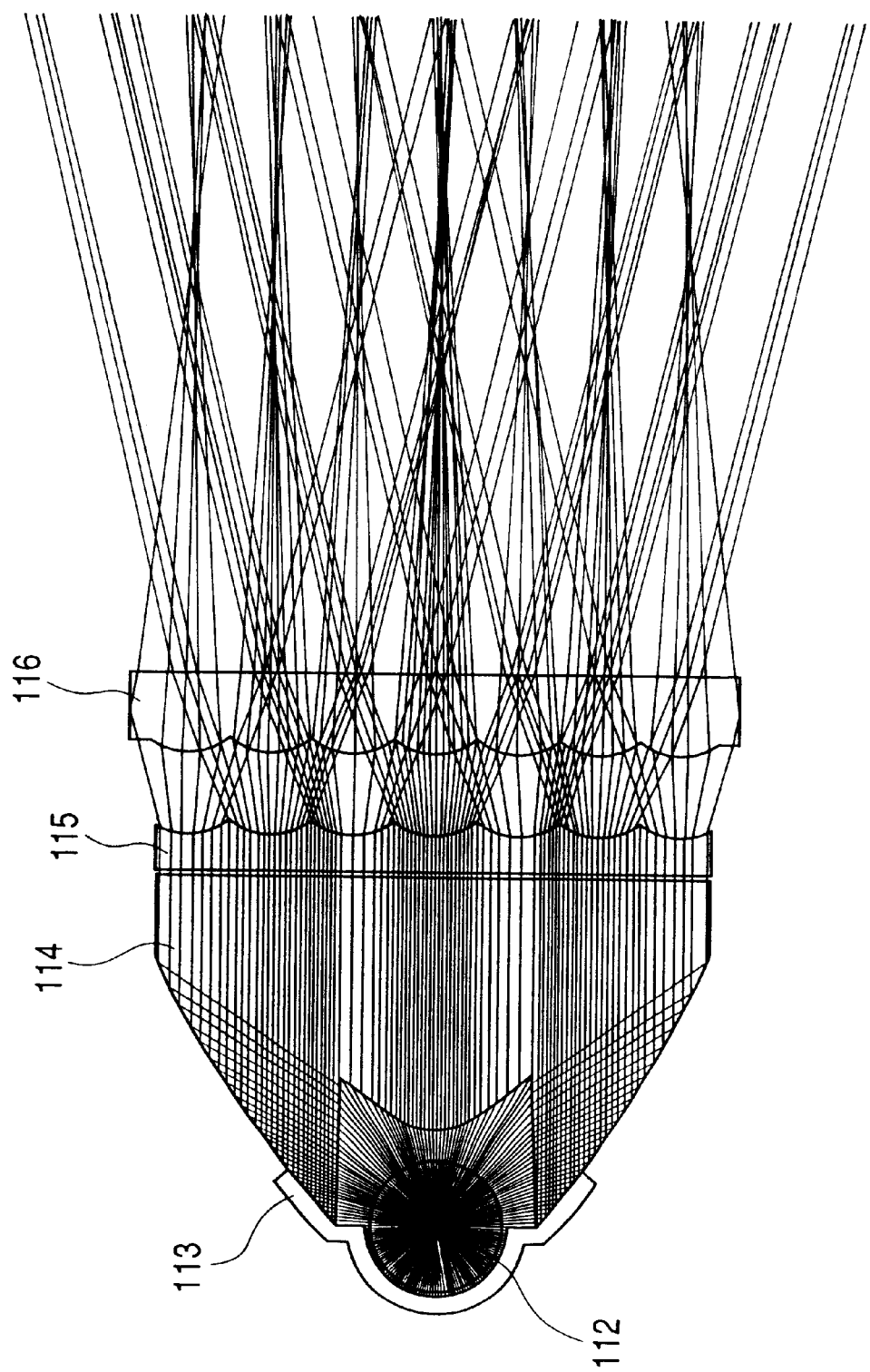
FIG. 23 is a longitudinal cross-sectional view showing a light beam distribution in a diverging state in the discharge tube radial direction of a flash emitting device in accordance with an eighth embodiment of the present invention.

Subsequently, an eighth embodiment of the present invention will be described with reference to FIG. 23. The eighth embodiment is characterized in that a negative refractive force is given to the cylindrical lenses formed on the zoom panel of the first embodiment. Also, the cylindrical surfaces having a positive refractive force are formed on the opposed surface of the front window so as to cancel the negative refractive force of the zoom panel, and the configurations of the respective lenses are regulated so as to coincide with each other. Hereinafter, this embodiment will be described with reference to FIG. 23.

Although being not shown, even if the concave and convex of a zoom panel 115 and a front window 116 are replaced by each other, the distribution characteristic of the converging state does not almost change, and the converging state is maintained. Also, even in FIG. 23 showing the diverging state where an interval between the zoom panel 115 and the front window 116 are far, it is understood that the degree of divergence is changed at a given rate, and even with this structure, the irradiating angle can be varied.

Also, in the above respective embodiments, there are shown the examples in which the light outgoing surface of the zoom panel and the corresponding surface of the front window coincide in configuration with each other, or the example in which the refractive force of the zoom panel and the front window are perfectly canceled by each other. However, the configurations do not always need to coincide with each other, and as shown in the fourth embodiment, the plane portion is disposed on a part of the front window to unify the light distribution characteristic, or a partial configuration of the corresponding surface of the light distribution is made different, and the divergence is given at that portion to provide an improvement so that the necessary light distribution characteristic is unified as a whole. Further, the entire configurations may be intentionally made different so that the refractive force is canceled at a point of the intermediate stage to converge the light most.

Also, in the above respective embodiments, there are shown that the relative position between the zoom panel and the front window is moved in the optical axis direction. However, the moving direction is not limited to the parallel movement with respect to the optical axis, and as shown in the seventh embodiment, the relative position between the zoom panel and the front window may be moved in the upward and downward direction in the vertical direction while it is being moved in parallel with the optical axis direction, or the respective panels may be rotated, and with those operation, the light distribution characteristic can be varied as in the above embodiments.

As was described above, according to the present invention, the converging optical system which is a base of the irradiating angle variable lighting optical system is improved, and the amount of movement with a variation of the irradiating angle is reduced unlike the prior art. Accordingly, the efficiency is extremely improved as the entire lighting optical system, and the entire configuration of the optical system is downsized to provide the structure of the size which can be mounted on the various optical devices.

Also, there can be provided the irradiating angle variable lighting device excellent in the optical characteristic such that the change in the light distribution characteristic can be continuously changed over, and the uniform light distribution can be obtained at all the zoom points.

Further, the irradiating angle variable lighting device according to the present invention is high in the degree of freedom of design and can readily design the optimum irradiating angle variable mechanism in accordance with the size, the mechanical precision, the optical characteristic, etc., which are required as a product.

Also, there is provided a technique extremely high in general purpose such that the irradiating angle variable mechanism can be structured inexpensively because the number of component is small, its applicable range of the optical system is wide and the mechanism can be applied to various lighting optical systems.

On the other hand, because the light convergence within the optical prism is conducted by using total reflection, the energy applying efficiency with respect to the same light source is high, the optical characteristic is not lowered even if the device is downsized, and the effective energy irradiated within the angle of view can be increased.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An irradiation angle variable lighting device, comprising:

light source means;

an optical prism disposed in front of said light source means for totally reflecting at least a part of an incident light beam from said light source means to irradiate the light beam onto an object to be photographed; and first and second optical members disposed on a side of the object to be photographed of said optical prism;

wherein a relative displacement of said first and second optical members is changed to vary an irradiating angle.

2. An irradiation angle variable lighting device according to claim 1, wherein said optical prism includes a light outgoing surface, a total reflecting surface, a first light incident surface that refracts a light from said light source means without reflecting the light for guiding the light to said light outgoing surface, and a second light incident surface for guiding the incident light to said total reflection surface and guiding the light reflected by said total reflection surface to said light outgoing surface.

3. An irradiation angle variable lighting device according to claim 2, wherein said optical prism is structured so that the light beam refracted by said first light incident surface and the light beam reflected by said second light incident surface and said total reflection surface are in parallel with each other on a given section.

4. An irradiation angle variable lighting device according to claim 3, wherein the light beam refracted by said first light incident surface and the light beam reflected by said second light incident surface and said total reflection surface are substantially in parallel with an outgoing optical axis of the lighting device.

5. An irradiation angle variable lighting device according to claim 2, wherein assuming that an inclination of the second light incident surface with respect to the outgoing optical axis of the lighting device is $\phi_0$, the following condition is satisfied:

$$0° \leq \phi_0 \leq 2°.$$

6. An irradiation angle variable lighting device according to claim 1, wherein said first optical member includes a plurality of lens portions each having a convergent function on the given section, and said second optical member includes a plurality of lens portions each having a divergent function on the given section.

7. An irradiation angle variable lighting device according to claim 6, wherein pitches between the respective lens portions of said first optical member and said second optical member in a direction along which the respective lens portions are arranged are identical with each other, and the paraxial focal distances of the respective lens portions on the given section thereof are identical with each other, and assuming that the pitches are p and the paraxial focal distances are D, the following conditional expression is satisfied:

$$p/2 \leq D \leq 2p.$$

8. An irradiation angle variable lighting device according to claim 6, wherein the pitches between the respective lens portions and the paraxial focal distances of the respective lens portions on the given section thereof are different from each other.

9. An irradiation angle variable lighting device according to claim 1, wherein said light source means includes a discharge tube, and when a longitudinal direction of said discharge tube is an axial direction of the discharge tuber, said first and second optical members include a plurality of lens portions arranged in parallel with the axial direction.

10. An irradiation angle variable lighting device according to claim 9, wherein each of the lens portions is made up of a cylindrical lens.

11. An irradiation angle variable lighting device according to claim 10, wherein the pitches of the respective cylindrical lenses of the first optical member and the second optical member in a direction along which the respective cylindrical lenses are arranged are identical with each other, and the paraxial focal distances on sections of the first and second optical members taken along faces perpendicular to the axial direction are identical with each other, and assuming that the pitches are p and the paraxial focal distances are D, the following conditional expression is satisfied:

$$p/2 \leq D \leq 2p.$$

12. An irradiation angle variable lighting device according to claim 9, wherein the respective lens portions on the sections perpendicular to the axial direction in said first optical member include a convergent function, and the respective lens portions on the sections perpendicular to the axial direction in said second optical member include a divergent function.

13. A photographing device including said irradiating angle variable lighting means according to claim 1.

14. An irradiating angle variable device, comprising:
   a discharge tube;
   a prism unit having an incident surface receiving a light from said discharge tube and an outgoing surface that ejects an incident light to a side of an object to be photographed; and
   a first optical unit and a second optical unit disposed on said prism unit on the side of the object to be photographed;
   wherein a relative interval between said first optical unit and said second optical unit are changed to vary a irradiating angle of the light directed toward the object to be photographed.

15. An irradiating angle variable device according to claim 14, wherein when the longitudinal direction of said discharge tube is an axis, each of said first and second optical units is formed with a plurality of lens portions which are arranged in parallel with the axis.

16. An irradiating angle variable device according to claim 15, wherein pitches of said plurality of lens portions formed on said first optical unit are identical with pitches of said plurality of lens portions formed on said second optical unit.

17. An irradiating angle variable device according to claim 16, wherein said plurality of lens portions formed on said first optical unit have a positive refractive force, and said plurality of lens portions formed on said second optical unit have a negative refractive force.

18. An irradiating angle variable device according to claim 14, wherein said prism unit includes a reflection surface, and a first incident surface and a second incident surface to which a light from said discharge tube is incident, the light incident to said second incident surface reaches said reflection surface, and the light incident to said first incident surface reaches said outgoing surface without being reflected.

* * * * *

UNITED STATES PATENT AND TRADEMARK OFFICE
CERTIFICATE OF CORRECTION

PATENT NO.     : 6,400,905 B1
DATED          : June 4, 2002
INVENTOR(S)    : Yoshiharu Tenmyo It is certified that error appears in the above-identified patent and that said Letters Patent is hereby corrected as shown below:

Column 3,
Line 39, "$\varphi$," should read -- $\varphi_0$, --.

Column 4,
Line 21, "includes" should read -- include --.

Column 13,
Line 34, "ever" should read -- over --.

Column 16,
Line 35, "and 2. FIG. 1" should read -- and 2. ¶ FIG. 1 --.

Column 17,
Line 15, "an" should read -- a --.

Signed and Sealed this

Twenty-sixth Day of November, 2002

Attest:

Attesting Officer

JAMES E. ROGAN
Director of the United States Patent and Trademark Office